(12) United States Patent
Maaref

(10) Patent No.: US 9,609,658 B2
(45) Date of Patent: Mar. 28, 2017

(54) SYSTEM AND METHOD FOR INTERFERENCE ALIGNMENT IN COGNITIVE SMALL CELL NETWORKS

(71) Applicant: Huawei Technologies Co., Ltd., Shenzhen (CN)

(72) Inventor: Amine Maaref, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 14/448,422

(22) Filed: Jul. 31, 2014

(65) Prior Publication Data

US 2015/0036623 A1 Feb. 5, 2015

Related U.S. Application Data

(60) Provisional application No. 61/860,737, filed on Jul. 31, 2013.

(51) Int. Cl.
*H04W 4/00* (2009.01)
*H04W 72/08* (2009.01)
(Continued)

(52) U.S. Cl.
CPC ......... *H04W 72/082* (2013.01); *H04J 11/005* (2013.01); *H04L 1/004* (2013.01);
(Continued)

(58) Field of Classification Search
USPC .......... 370/252–329, 342–352; 375/267–348
See application file for complete search history.

(56) References Cited

U.S. PATENT DOCUMENTS

| 8,422,469 | B2 * | 4/2013 | Guvenc | H04L 5/0007 370/338 |
| 9,036,460 | B2 * | 5/2015 | Maaref | H04L 25/3904 370/208 |

(Continued)

FOREIGN PATENT DOCUMENTS

| CN | 101662321 A | 3/2010 |
| CN | 102271006 A | 12/2011 |

(Continued)

OTHER PUBLICATIONS

Cadambe, V., et al, "Interference Alignment and Degrees of Freedom of the K-User Interference Channel," IEEE Transactions on Information Theory, vol. 54, No. 8, Aug. 2008, 17 pages.

(Continued)

*Primary Examiner* — Man Phan
(74) *Attorney, Agent, or Firm* — Slater Matsil, LLP

(57) ABSTRACT

Aspects of this disclosure provide techniques for computing Vandermonde-subspace frequency division multiplexing (VFDM) precoders for secondary network transmissions that mitigate interference between secondary communication signals, while avoiding interference with the primary system altogether. A precoder for a secondary user (SU) is computed on accordance with a nullspace induced by cyclic prefixes communicated over a primary data channel, a primary interference channel between a second user (SU) and the primary receiver, and a secondary interference channel between the SU and a neighboring SBS. The precoder provides both frequency domain precoding and spatial domain precoding on secondary transmission signals communicated from the SU.

20 Claims, 5 Drawing Sheets

(51) Int. Cl.
  *H04L 1/00*    (2006.01)
  *H04L 25/03*   (2006.01)
  *H04J 11/00*   (2006.01)
  *H04W 16/14*   (2009.01)
  *H04L 27/00*   (2006.01)
(52) U.S. Cl.
  CPC .... *H04L 25/03891* (2013.01); *H04L 27/0006* (2013.01); *H04W 16/14* (2013.01)

(56) References Cited

U.S. PATENT DOCUMENTS

| | | | | |
|---|---|---|---|---|
| 9,042,476 B2* | 5/2015 | Krishnamurthy | .... | H04B 7/0456 375/267 |
| 2006/0067420 A1* | 3/2006 | Li et al. | .............. | H04L 25/0226 375/267 |
| 2009/0207735 A1* | 8/2009 | Ben et al. | ............. | H04L 5/0032 370/237 |
| 2013/0064114 A1* | 3/2013 | Gollakota | ............ | H04B 7/0452 370/252 |
| 2014/0112295 A1* | 4/2014 | Xu et al. | .............. | H04B 7/0024 370/329 |
| 2015/0003547 A1* | 1/2015 | Maaref | ................ | H04B 7/0426 375/267 |

FOREIGN PATENT DOCUMENTS

| | | |
|---|---|---|
| CN | 102932042 A | 2/2013 |
| CN | 103220034 A | 7/2013 |

OTHER PUBLICATIONS

Cardoso, L., et al., "Vandermonde Frequency Division Multiplexing for Cognitive Radio," IEEE 9th Workshop on Signal Processing Advances in Wireless Communications, Jul. 6-9, 2008, pp. 421-425.

Cardoso, L., et al., "Vandermonde-Subspace Frequency Division Multiplexing Receiver Analysis," 2010 IEEE 21st International Symposium on Personal Indoor and Mobile Radio Communications, Sep. 26-30, 2010, Istanbul Turkey, pp. 293-298.

Cardoso, et al., "Orthogonal LTE Two-Tier Cellular Networks," Communications (ICC), 2011 IEEE International Conference on Communications, Jun. 5-9, 2011, Kyoto, Japan, 5 pages.

International Search Report and Written Opinion received in PCT/CN2014/083462, mailed Nov. 3, 2014, 12 pages.

Krikidis, I., "Space Alignment for Cognitive Transmission in MIMO Uplink Channels," EURASIP Journal on Wireless Communications and Networking, vol. 2010, Article ID 465157, 6 pages.

Lee, N., et al., "Interference Alignment with Limited Feedback for Two-Cell Interfering MIMO-MAC," 2012 IEEE International Symposium on Wireless Communication Systems (ISWCS), Aug. 28-31, 2012, pp. 566-570.

Lu, L., et al., "Signal Alignment for Two-Cell CR Networks," 2013 IEEE Wireless Communications and Networking Conference (WCNC), Apr. 7-10, 2013, pp. 3568-3572.

Lu, L., et al., "Opportunistic Transmission Exploiting Frequency- and Spatial-Domain Degrees of Freedom," IEEE Wireless Communications, Apr. 2014, pp. 91-97.

Lu, L., et al., "Spatial-Frequency Signal Alignment for Opportunistic Transmission" IEEE Transaction on Signal Processing, vol. 62, Issue 6, Jan. 22, 2014, pp. 1561-1575.

Maso, M., et al., "Cognitive Interference Alignment for Heterogeneous Two-Tiered Self-Organizing Networks," IEEE Transactions on Vehicular Technology, 2012, 32 pages.

Maso, M., et al., "Cognitive Orthogonal Precoder for Two-tiered Networks Deployment," IEEE Journal on Selected Areas in Communications, vol. 31, Issue 11, May 23, 2013, pp. 2338-2348.

Perlaza, et al., "From Spectrum Pooling to Space Pooling: Opportunistic Interference Alignment in MIMO Cognitive Networks," IEEE Transactions on Signal Processing, Mar. 18, 2010, vol. 58, Issue 7, pp. 3728-3741.

* cited by examiner

SYSTEM AND METHOD FOR INTERFERENCE ALIGNMENT IN COGNITIVE SMALL CELL NETWORKS

This patent application claims priority to U.S. Provisional Application No. 61/860,737, filed on Jul. 31, 2013 and entitled "System and Method for Interference Alignment in Cognitive Small Cell Networks," which is hereby incorporated by reference herein as if reproduced in its entirety.

TECHNICAL FIELD

The present invention relates to a system and method for wireless communications, and, in particular embodiments, to a system and method for interference alignment in cognitive small cell networks.

BACKGROUND

Cognitive radio systems often include a primary network and one or more secondary networks, where the secondary networks automatically detect available channels in wireless spectrums, and change transmission or reception parameters to increase the spectral efficiency of a given spectrum band in the cell. The primary network may communicate without deference to communications in the secondary network communications, while the secondary networks may communicate in a manner that avoids interfering with primary network communications. Some cognitive radio systems include multiple secondary networks. While conventional cognitive radio communication techniques are relatively adept at avoiding interference between secondary networks and the primary network, they generally do not include measures to mitigate interference between respective secondary network communications. As such, there may be significant interference between secondary signals in cognitive radio systems that include multiple secondary networks. Accordingly, techniques for allocating resources in secondary networks that mitigate interference between secondary network communications, while continuing to avoid inter-cell-interference with primary network communications, are desired.

SUMMARY OF THE INVENTION

Technical advantages are generally achieved, by embodiments of this disclosure which describe a system and method for interference alignment in cognitive small cell networks.

Technical advantages are generally achieved, by embodiments of this disclosure which describe a system and method for interference alignment in cognitive small cell networks.

In accordance with an embodiment, a method for signal alignment in a cognitive multi-cell secondary system is provided. In this example, the method comprises determining a nullspace induced by cyclic prefixes communicated over a primary data channel extending from a primary transmitter to a primary receiver. The nullspace is determined by a first secondary base station (SBS) that is configured to receive data transmissions from a first one of a plurality of secondary users (SUs). The method further includes determining a primary interference channel of the first SU and a secondary interference channel of the first SU. The primary interference channel of the first SU extends from the first SU to the primary receiver. The secondary interference channel of the first SU extends from the first SU to a second SBS. The second SBS is configured to receive data transmissions from a second one of the plurality of Sus. The method further includes deriving a precoder for the first SU in accordance with the primary interference channel, the secondary interference channel, and the nullspace induced by cyclic prefixes communicated over the primary data channel, and communicating the precoder to the first SU. An apparatus for performing this method is also provided.

In accordance with another embodiment, a method for signal alignment in a cognitive multi-cell secondary system is provided. In this example, the method comprises determining a nullspace induced by cyclic prefixes communicated over a primary data channel extending from a primary transmitter to a primary receiver, determining at least a first set of primary interference channels and a second set of primary interference channels for a plurality of secondary users (SUs). The plurality of SUs include at least a first set of SUs configured to communicate with a first secondary base station (SBS) and a second set of SUs configured to communicate with a second SBS. The first set of primary interference channels extend from SUs in the first set of SUs to the primary receiver. The second set of primary interference channels extend from SUs in the second set of SUs to the primary receiver. The method further includes determining at least a first set of secondary interference channels and a second set of secondary interference channels for the plurality of Sus. The first set of secondary interference channels extend from SUs in the first set of SUs to the second SBS. The second set of secondary interference channels extend from SUs in the second set of SUs to the first SBS. The method further includes deriving precoders for the plurality of SUs in accordance with the first set of primary interference channels, the second set of primary interference channels, the first set of secondary interference channels, the second set of secondary interference channels, and the nullspaces induced by the cyclic prefixes communicated over the primary data channel, and communicating the precoders to the plurality of SUs. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
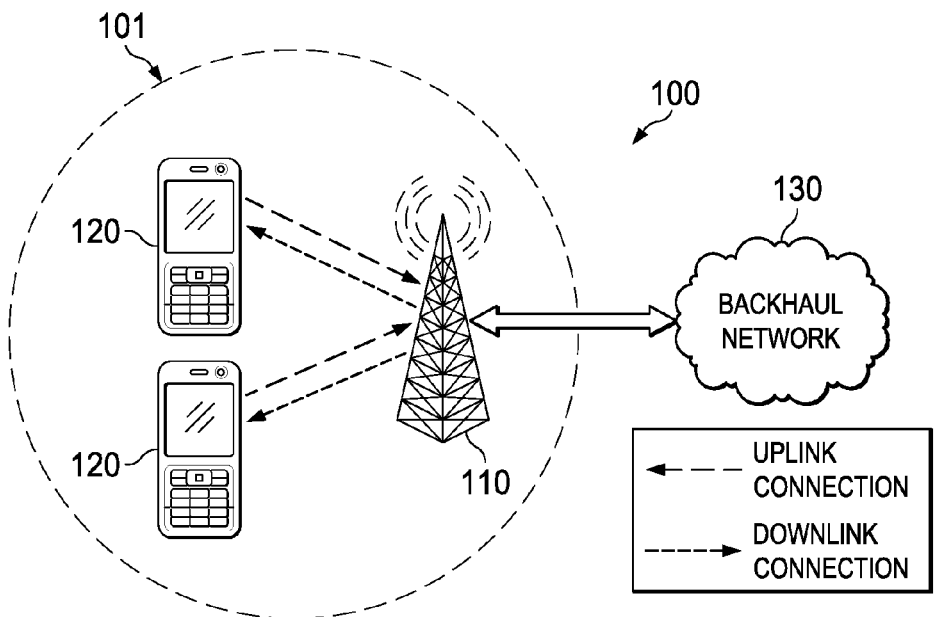
FIG. 1 illustrates a diagram of an embodiment wireless communications network.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Vandermonde-subspace frequency division multiplexing (VFDM) is an overlay spectrum sharing technique for cognitive radio. VFDM makes use of a precoder based on a Vandermonde structure to transmit information over a secondary system, while keeping an orthogonal frequency division multiplexing (OFDM)-based primary system interference-free. To do so, VFDM exploits frequency selectivity and the use of cyclic prefixes by the primary system More specifically, precoders obtained through VFDM align secondary channel interference with cyclic-prefixes communicated over the primary link. Since cyclic prefix bits are duplicative, the secondary network interference does not affect reception quality of primary network communications. Techniques for combining Vandermonde-subspace frequency division multiplexing (VFDM) to avoid inter-cell-interference between secondary and primary networks are discussed in U.S. patent application Ser. No. 13/929,493 filed on Mar. 27, 2013 and entitled "System and Method for Interference Avoidance Based on Signal Alignment in Two-Tier MIMO OFDM," which is incorporated by reference herein as if reproduced in its entirety.

Aspects of this disclosure provide techniques for computing VFDM precoders for secondary network transmissions that mitigate interference between secondary communication signals, while avoiding interference with the primary system altogether. In one embodiment, a secondary base station (SBS) computes a precoder for a secondary user (SU) in accordance with a nullspace induced by cyclic prefixes communicated over a primary data channel, a primary interference channel between a second user (SU) and the primary receiver, and a secondary interference channel between the SU and a neighboring SBS. The precoder provides both frequency domain precoding and spatial domain precoding on secondary transmission signals communicated from the SU. The frequency domain precoding aligns interference from the secondary transmission signal with the nullspace induced by the cyclic prefixes communicated over the primary data channel. The spatial domain precoding mitigates interference from the secondary transmission signal at spatial locations associated with both the primary receiver and the neighboring SBS. In another embodiment, a central controller computes a set of precoders for a set of SUs in accordance with a nullspace induced by cyclic prefixes communicated over a primary data channel, sets of primary interference channels, and sets of secondary interference channels. The sets of primary interference channels include an interference channel between each SU and the primary receiver, while the sets of secondary interference channels includes an interference channel between each SU and each SBS. The precoders collectively mitigate interference from secondary transmission signals at spatial locations associated with both the primary receivers and the SBSs. These and other aspects are described in greater detail below.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Aspects of this disclosure provide opportunistic transmission based on signal alignment for multiple-input multiple-output (MIMO) orthogonal frequency-division multiplexing (OFDM) cognitive radio (CR) systems, where both primary and secondary users have multiple antennas. Primary users may be transmitting based on OFDM and secondary users generate interference-free transmission to the primary users by using both the spatial and frequency space leftover by the primary system. Moreover, inter-cell and intra-cell interference among secondary is reduced by designing precoders that align secondary transmissions in the spatial domain such that interference is mitigated at spatial location of the primary user, as well as spatial locations of the secondary user. Precoding matrix designs are provided for perfectly-aligned and partially-aligned transmissions. Two chordal-distance based schemes, called as exhaustive search algorithm and heuristic algorithm, will be developed for each case. Compared to the traditional time-division multiple access (TDMA) scheme, the proposed scheme can support more interference-free symbols to be transmitted by secondary users simultaneously.

Figure 2:
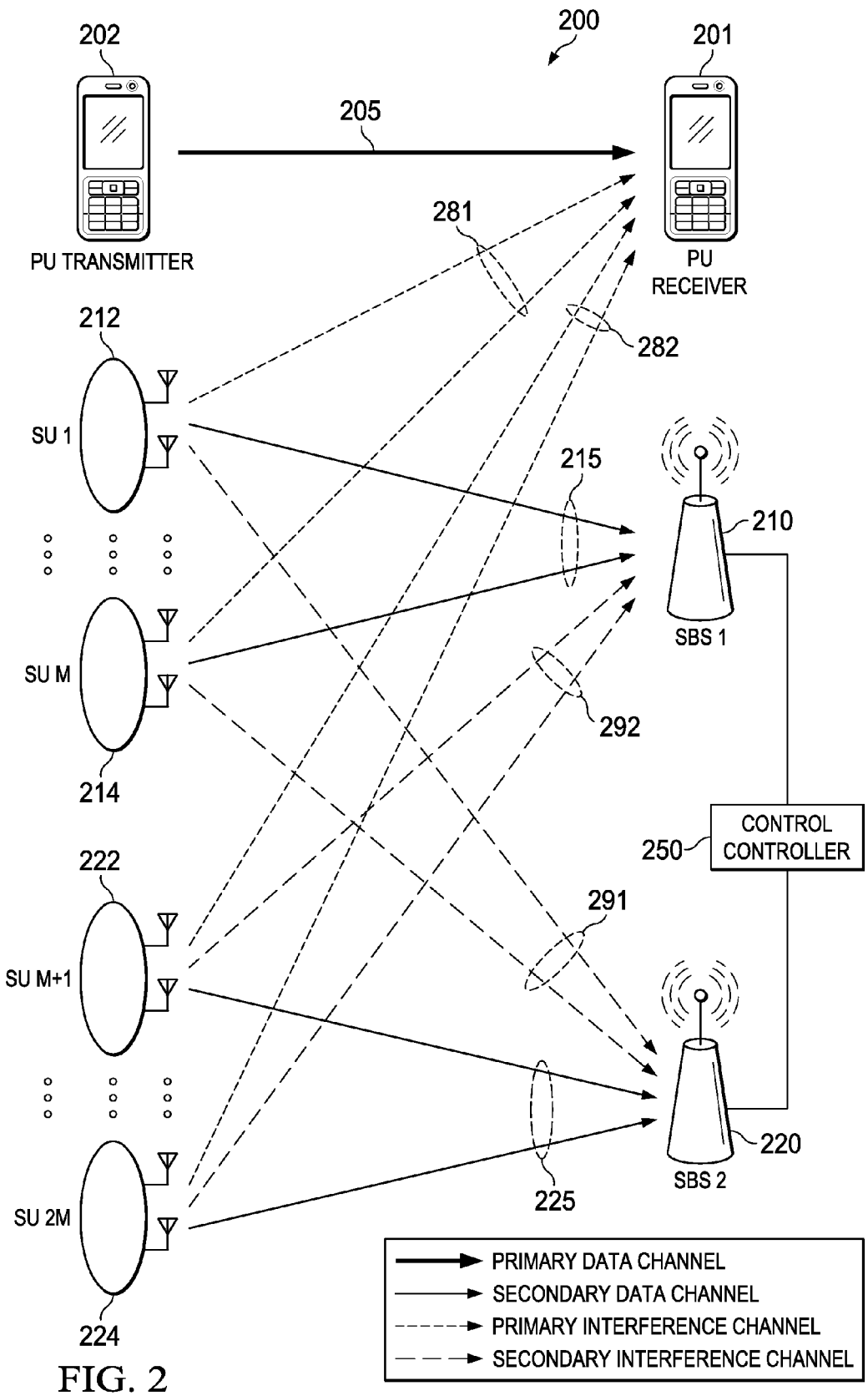
FIG. 2 illustrates a diagram of an embodiment cognative radio network.
Figure 3:
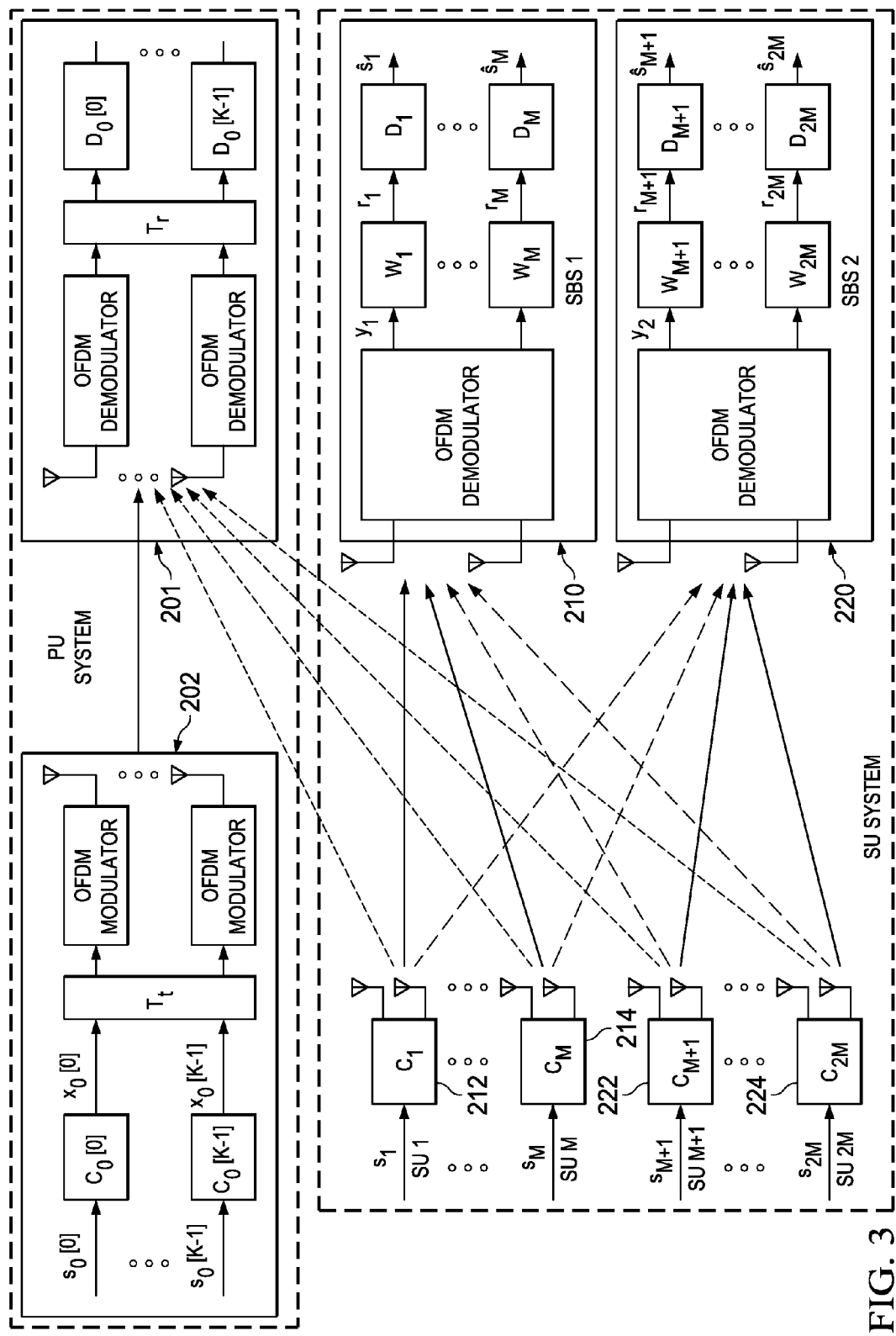
FIG. 3 illustrates a diagram of multiple-input-multiple-output (MIMO) interfaces of devices in an embodiment cognative radio network.

In CR networks, the licensed users, or called primary users (PUs) have priorities to use the spectrum bands while the CR users, also called as secondary users (SUs), can opportunistically access the spectrum bands as long as they will not generate unacceptable interference to the PUs. FIG. 2 illustrates a cognative radio network 200 adapted to communicate secondary transmissions in accordance with precoders computed by embodiment techniques provided by this disclosure. As shown, the cognative radio network 200 includes a primary receiver 201, a primary transmitter 202, a plurality of secondary base stations (SBSs) 210, 220, and a plurality of secondary users (SUs) 212-214, 222-224. As referred to herein, the terms "primary receiver" and "primary transmitter" refer to any devices participating in licensed communication, while the terms "secondary user" and "secondary base station" refer to any devices participating in unlicensed communications or (in some cases) lower priority licensed communications. Devices in the cognative radio network 200 have MIMO capability, as illustrated by FIG. 3. The cognative radio network 200 optionally includes a central controller 250. The central controller 250 may be any network device. In an embodiment, the central controller 250 and the SBSs 210, 220 are separate and distinct network devices. In other embodiments, the central controller 250 is a component on one of the SBSs 210, 220.

The primary transmitter 202 communicates primary transmissions to the primary receiver 201 via a primary data channel 205. The SUs 212-214 communicate secondary transmissions to the SBS 210 via the secondary data channels 215, while the SUs 222-224 communicate secondary transmissions to the SBS 220 via the secondary data channels 225. Secondary transmissions communicated over the secondary data channels 215 produce interference that propagates to the primary receiver 201 via a set of primary interference channels 281, as well as to the SBS 220 via a set of secondary interference channels 291. Likewise, secondary transmissions communicated over the secondary data channels 225 may result in interference that propagates to the primary receiver 201 via a set of primary interference channels 282 and to the SBS 210 via a set of secondary interference channels 292.

The SBS 210 (or the central controller 250) may use the primary interference channels 281 to derive a nullspace associated with spatial location of the primary receiver 201, and the secondary interference channels 291 to derive a nullspace associated with spatial location of the SBS 220. Likewise, the SBS 220 (or the central controller 250) may derive nullspaces for the primary receiver 201 and the SBS 210 in accordance with the primary interference channels 282 and the secondary primary interference channels 292, respectively. Moreover, the primary transmitter 202 may communicate cylic prefixes in timeslots of a radio frame transported over the primary data channel 205. Knowledge of these timeslots may allow the SBSs 210, 220 (or the central controller 250) to derive a null-space induced by communication of those cyclic prefixes.

Overlaps in the aforementioned nullspaces may be used to compute precoders In some embodiments, the SBSs 210 and 220 may independently compute precoders for their respect sets of SUs 212-214 and 222-224 (respectively) that exploit regions in which the nullspaces overlap. For example, the SBS 210 may compute precoders for the SUs 212-214 in accordance with nullspaces derived from the set of primary interference channels 281, the set of secondary interference channels 291, and the resources (e.g., timeslots) used to carry cyclic prefixes over the primary data channel 205. Likewise, the SBS 220 may compute precoders for the SUs 222-224 in accordance with nullspaces derived from the set of primary interference channels 282, the set of secondary interference channels 292, and the resources (e.g., timeslots) used to carry cyclic prefixes over the primary data channel 205. As another example, the central controller 250 may compute precoders for the SUs 212-214, 222-224 in accordance with nullspaces derived from the sets of primary interference channels 281, 282, the sets of secondary interference channels 291, 292, and the resources (e.g., timeslots) used to carry cyclic prefixes over the primary data channel 205.

Figure 4:
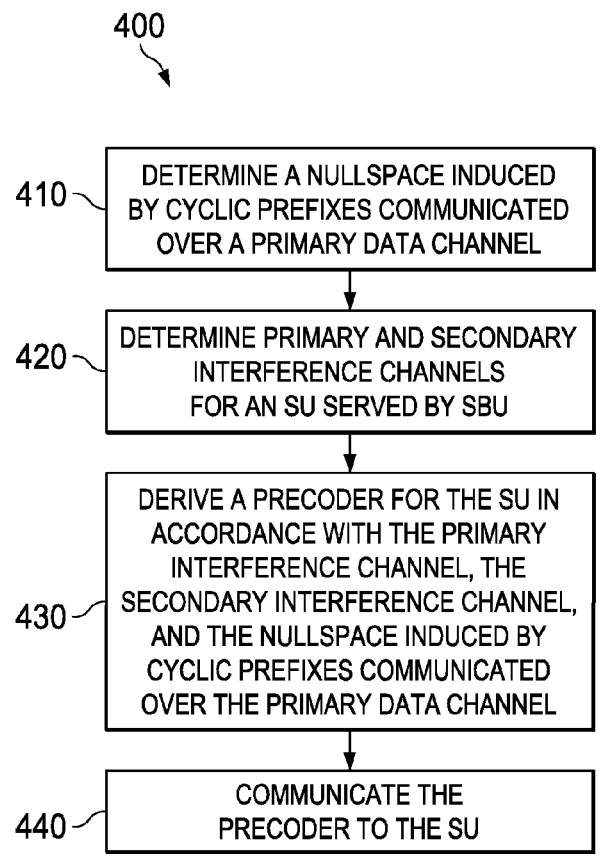
FIG. 4 illustrates a flowchart of an embodiment method for computing a precoder to be used during secondary transmissions in a cognative radio network.

Aspects of this disclosure provide a method for computing a precoder for a secondary user. FIG. 4 illustrates a method 400 for computing a precoder for secondary transmissions of a secondary user that mitigate interference at neighboring secondary base stations while still avoiding interference with the primary communications network, as might be performed by a secondary base station. As shown, the method 400 begins at step 410, where the secondary base station determines a nullspace induced by cyclic prefixes communicated over a primary data channel. Next, the method 400 proceeds to step 420, where the secondary base station determines a primary interference channel of the SU and a secondary interference channel of the SU. Thereafter, the method 400 proceeds to step 430, where the secondary base station derives a precoder for the SU in accordance the primary interference channel, the secondary interference channel, and the nullspace induced by cyclic prefixes communicated over the primary data channel. Finally, the method 400 proceeds to step 440, where the secondary base station communicates the precoder to the SU.

Figure 5:
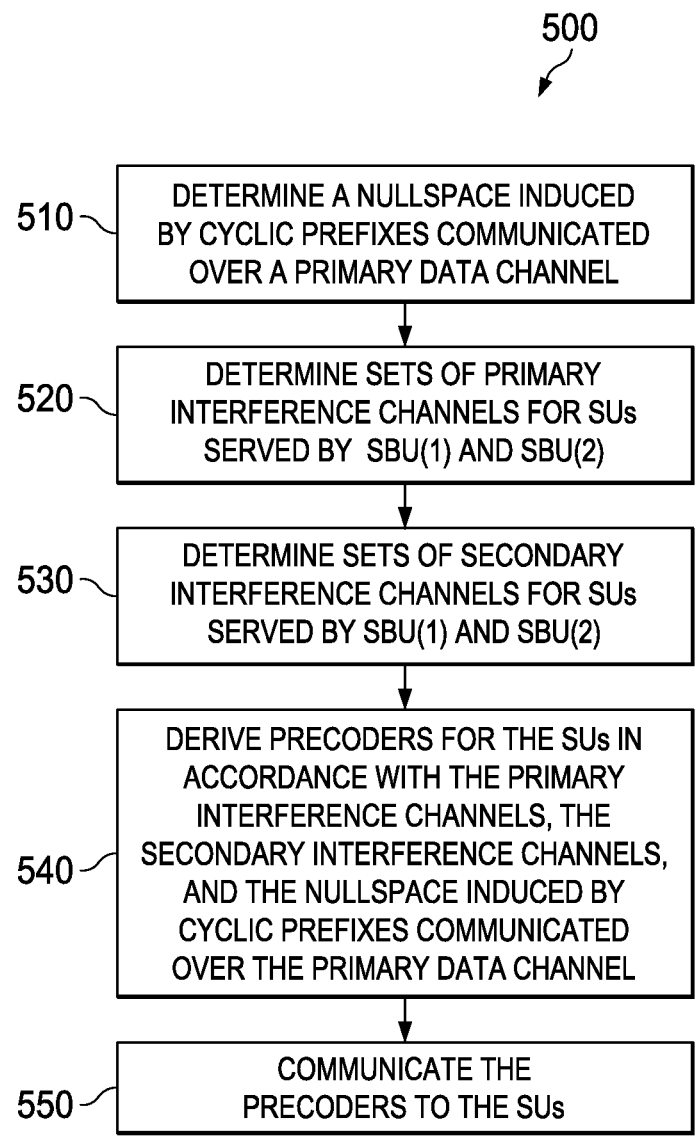
FIG. 5 illustrates a flowchart of another embodiment method for computing precoders to be used during secondary transmissions in a cognative radio network.

Aspects of this disclosure provide methods for computing precoders for SUs served by multiple SBs in a centralized fashion. FIG. 5 illustrates a method 500 for computing precoders for SUs in multiple secondary networks by a central controller. As shown, the method 500 begins at step 510, where the central controller determines a nullspace induced by cyclic prefixes communicated over a primary data channel. Next, the method 500 proceeds to step 520, where the central controller determines sets of primary interference channels of SUs being served by at least a first SBS (e.g., SBS(1)) and a second SBS (e.g., SBS(2)). Thereafter, the method 500 proceeds to step 530, where the central controller determines sets of secondary interference channels of the SUs being served by at least the first SBS and the second SBS. Next, the 500 proceeds to step 540, where the central controller derives a precoder for the SUs in accordance the sets of primary interference channels, the sets of secondary interference channels, and the nullspace induced by cyclic prefixes communicated over the primary data channel. Finally, the method 500 proceeds to step 550, where the central controller communicates the precoders to the SUs, as may be accomplished by indirectly relaying the precoders through the secondary base stations, or by direct communicating the precoders to the SUs, e.g., via higher-layer signaling, broadcast, etc.

Aspects of this disclosure provide techniques for designing precoders for use in secondary transmissions that mitigate interference at neighboring secondary base stations, while avoiding interference with primary network communications According to interference constraints, CR designs can be divided into two categories: one allows tolerable interference at the PUs while the other one requires SUs to generate no interference to the Pus. The schemes in the first category are suitable for the scenarios that PUs can tolerate a certain level of performance degradation. Given channel state information (CSI) of interference channels from SUs to PUs, interference power at PUs can be maintained under a given threshold. Transmit covariance matrices of SUs are designed to maximize their own throughput. When only the statistics of interference CSI are known or the CSI has error, SUs can be designed to control average interference to the PUs or to guarantee PUs' averageor outage performance. Aspects of this disclosure design precoders for at least the second category, where the transmission of SUs are designed to be orthogonal to the PU's transmission and no interference will be generated. In this case, the PU's performance is the same as there is no SU's transmission.

With multiple antennas at SUs, precoding can be used to generate interference-free transmission from the secondary system to the primary system. Given CSI of the interference channel from the secondary transmitter to the primary receiver, the secondary transmitter can project its transmit signal onto the null space of the interference channel to generate interference-free transmission to the primary link, which is similar as a traditional zero-forcing (ZF) scheme. Moreover, if the transmission strategies, such as precoding and power allocation scheme, of the primary system are known to the secondary system, advanced interference alignment (IA) schemes can be used to extend the dimensions available to the secondary system via opportunistic interference avoidance (OIA). Besides using the null space of the interference channel, OIA also uses the spatial dimensions left over by the primary system generated by power allocation. The effective interference CSI can be learned by listening signals from PUs. Besides power allocation, ill-conditioned channel matrix also can provide more freedom for opportunistic transmission. To further improve the performance of the secondary link, transmit power on the subspace can be set to zero when the power allocated on it is below a given threshold.

Instead of using spatial dimensions, Vandermonde-sub-space frequency division multiplexing (VFDM) has been proposed to exploit extra dimensions of the cyclic-prefix (CP) of orthogonal frequency-division multiplexing (OFDM) in the primary system. n VFDM, the signal from the secondary transmitter is projected on the null space generated by the cyclic prefixes.

Aspects of this disclosure use interference avoidance techniques based on signal alignment for a MIMO-OFDM system using both spatial and frequency dimensions. For the primary MIMO-OFDM system, its transmission is the same as the case without the secondary system. A secondary system designed for multiple PU pairs based on orthogonal frequency-division multiple access (OFDMA) can use the scheme for one PU pair based on OFDM. Multi-point coordinated transmission or network MIMO transmission can be used for interference mitigation in multiuser MIMO systems. One scheme is based on block diagonalization (BD), where the precoding matrix of one SU lies in the null space of the composite interference channel matrix constructed by channel matrices from it to other SUs. Aspects of this disclosure use interference alignment schemeds to minimize their dimensions at secondary BSs (SBSs) to maximize the available dimension of the signals from its own SUs. At SBSs, ZF decoding is used to mitigate both intra- and inter-cell interference, leading to interference-free transmission for each SU. In general, the IA-based linear beamforming design to maximize total achievable degree-of-freedom (DOF) for multiuser MIMO system is NP-hard.

Aspects of this disclosure provide signal alignment scheme for the secondary system to use both spatial and frequency dimensions leftover by the primary system. Multiple-antenna Pus may be transmitting based on OFDM and SUs may be transmitting without generating interference to the PUs. Based on a two-cell secondary uplink setting, it is possible to analyze the number of interference-free symbols can be transmitted by each SU by mitigating both inter- and intra-cell interference within the secondary system together with mitigating interference to the primary system. Results for both perfectly- and partially-aligned transmissions are discussed.

A precoding matrix for both perfectly- and partially-aligned transmission cases are provided. Two chordal-distance based schemes, called as exhaustive search and heuristic algorithms, are developed for each case.

Aspects of this disclosure disclose transmission schemes for the secondary system to generate interference-free transmission to the primary system. One primary link uses $N_t$ input and $N_r$ output OFDM system with K subcarriers and L points of CP. For the secondary system, each cell consists of one SBS with $M_r$ antennas and M SUs, each with $M_t$ antennas. Denote the primary transmitter as node 0, the i-th SU in cell 1 as node i (i=1, 2, . . . , M) and the j-th SU in cell 2 as node j+M (j=1, 2, . . . , M). The primary receiver is denoted as node 0 while the i-th SBS is denoted as node i (i=1, 2).

Channels between any link of transmit and receive antenna may be frequency-selective and with no more than L+1 taps. Denote $\Gamma_{i,j}^{(k,n)}$ as a circulant time-domain channel matrix from the k-th transmit antenna of the i-th transmit node to the n-th receive antenna of the j-th receive node. Then, $\Gamma_{i,j}^{(k,n)}$ can be expressed follows:

$$\Gamma_{i,j}^{(k,n)} = \begin{pmatrix} h_{i,j}^{(k,n)}[0] & 0 & \cdots & 0 & h_{i,j}^{(k,n)}[L] & \cdots & \cdots & h_{i,j}^{(k,n)}[1] \\ \vdots & \ddots & \ddots & \ddots & \ddots & \ddots & \ddots & \vdots \\ \vdots & \ddots & \ddots & \ddots & \ddots & \ddots & \ddots & h_{i,j}^{(k,n)}[L-1] \\ h_{i,j}^{(k,n)}[L] & \ddots & \ddots & \cdots & h_{i,j}^{(k,n)}[0] & 0 & \cdots & 0 \\ 0 & \ddots & \ddots & \ddots & \ddots & \ddots & \ddots & \vdots \\ \vdots & \ddots & \ddots & \ddots & \ddots & \ddots & \ddots & 0 \\ 0 & \cdots & \cdots & 0 & h_{i,j}^{(k,n)}[L] & \cdots & \cdots & h_{i,j}^{(k,n)}[0] \end{pmatrix}, \quad (1)$$

where $h_{i,j}^{(k,n)}[l]$ denotes the channel impulse response of the l-th tap from the k-th transmit antenna of the i-th transmit node to the n-th receive antenna of the j-th receive node. All channel coefficients are assumed to be independent and identically distributed (i.i.d.) following Rayleigh distribution.

A received signal vector at the primary receiver after OFDM demodulation can be represented as $$y_0 = H_{0,0}x_0 + \sum_{i=1}^{2M} H_{i,0}x_i + FBn_0, \quad (2)$$

where $H_{0,0} \in \mathbb{C}^{N_r K \times N_t K}$ is the effective channel matrix from the primary transmitter, $H_{i,0} \in \mathbb{C}^{N_r K \times M_t(K+L)}$ is the effective channel matrix from the i-th SU, $x_0 \in \mathbb{C}^{N_t K \times 1}$ is the transmit vector from the primary transmitter, $x_i \in \mathbb{C}^{M_t(K+L) \times 1}$ is the transmit signal vector from the i-th SU, and $n_0 : \mathcal{CN}(0, \sigma^2 I_K)$ is an additive white Gaussian noise vector. The effective channel matrices in (2) can be expressed as follows:

$$H_{0,0} = (FB) \otimes \begin{pmatrix} \Gamma_{0,0}^{(1,1)} A F^H & \cdots & \cdots & \Gamma_{0,0}^{(N_t,1)} A F^H \\ \Gamma_{0,0}^{(1,2)} A F^H & \cdots & \cdots & \Gamma_{0,0}^{(N_t,2)} A F^H \\ \vdots & \vdots & \ddots & \vdots \\ \Gamma_{0,0}^{(1,N_r)} A F^H & \cdots & \cdots & \Gamma_{0,0}^{(N_t,N_r)} A F^H \end{pmatrix}, \quad (3)$$

and $$H_{i,0} = (FB) \otimes \begin{pmatrix} \Gamma_{i,0}^{(1,1)} & \Gamma_{i,0}^{(2,1)} & \cdots & \Gamma_{i,0}^{(M_t,1)} \\ \Gamma_{i,0}^{(1,2)} & \ddots & \ddots & \Gamma_{i,0}^{(M_t,2)} \\ \vdots & \ddots & \ddots & \vdots \\ \Gamma_{i,0}^{(1,M_r)} & \cdots & \cdots & \Gamma_{i,0}^{(M_t,M_r)} \end{pmatrix}, \quad (4)$$

where $A \in \mathbb{C}^{(K+L) \times K}$ and $B \in \mathbb{C}^{K \times (K+L)}$ are the CP insertion and removal matrices, respectively, $$F = \frac{1}{\sqrt{K}} \left( e^{-j2\pi \frac{nk}{K}} \right)_{k,n=0}^{K-1}$$

is a normalized DFT matrix, and ⊗ is the Kronecker product.

For the primary link, the operation is the same as the scenario that the secondary link does not exist and the precoding and postcoding are conducted on each subcarrier. Denote $s_0[k] \in C^{d_0 \times 1}$ and $C_0[k] \in C^{N_t \times d_0}$ as the source signal and the precoding matrix at the primary transmitter on the k-th subcarrier, respectively, where $d_0 \leq \min\{N_t, N_r\}$ is the number of symbols transmitted on each subcarrier of the primary link. Then, the transmit signal vector at the primary transmitter on the k-th subcarrier, $x_0[k] \in C^{N_t \times 1}$, after precoding can be expressed as $x_0[k] = C_0[k]s_0[k]$. (5).

Denote $H_{0,0}[k] \in C^{N_r \times N_t}$ as the equivalent MIMO channel of the primary link on the k-th subcarrier, which can be expressed as $$H_{0,0}[k] = \begin{pmatrix} H_{0,0}^{(1,1)}[k] & \cdots & \cdots & H_{0,0}^{(N_t,1)}[k] \\ H_{0,0}^{(1,2)}[k] & \cdots & \cdots & H_{0,0}^{(N_t,2)}[k] \\ \vdots & \vdots & \ddots & \vdots \\ H_{0,0}^{(1,N_r)}[k] & \cdots & \cdots & H_{0,0}^{(N_t,N_r)}[k] \end{pmatrix}, \quad (6)$$

where $H_{0,0}^{(i,j)}[k]$ is the channel frequency response on the k-th subcarrier from the i-th transmit antenna to the j-th receive antenna of the primary link. Based on the property of OFDM transmission, $$H_{0,0}^{(i,j)}[k] = \sum_{l=0}^{L} h_{0,0}^{(i,j)}[l] e^{\frac{-i 2\pi k l}{K}}.$$

Denote singular-value decomposition (SVD) of $H_{0,0}[k]$ as $H_{0,0}[k] = U_{0,0}[k]\Lambda_{0,0}[k](V_{0,0}[k])^H$, (7), where $U_{0,0}[k] \in C^{N_r \times N_r}$ and $V_{0,0}[k] \in C^{N_t \times N_t}$ are unitary matrices, and $\Lambda_{0,0}[k] \in C^{N_r \times N_t}$ is a diagonal matrix with diagonal elements $(\lambda_{0,0,(1)}[k], \ldots, \lambda_{0,0,(\min\{N_t,N_r\})}[k])$ such that $|\lambda_{0,0,(1)}[k]|^2 \geq \ldots \geq |\lambda_{0,0,(\min\{N_t,N_r\})}[k]|^2$, where $\lambda_{0,0,(h)}[k]$ is the h-th singular values of $H_{0,0}[k]$.

To maximize the data rate of the primary link, the precoding and postcoding matrices on the k-th subcarrier are used and can be expressed as $C_0[k] = V_{0,0}[k]$, (8) and $D_0[k] = (U_{0,0}[k])^H$, (9), respectively.

The precoding at the primary transmitter is done on each subcarrier while the transmit signal, $x_0$ in (2), is constructed by the signal vectors on each transmit antenna. Denote $T_t \in C^{N_t K \times N_t K}$ as a matrix to rearrange symbols on each subcarrier to a transmit stream one each antenna, where its (i, j) entry is $$t_{i,j} = \begin{cases} 1 & j = \left\lfloor \frac{i-1}{K} \right\rfloor + ((i-1)_{\mod K})N_t + 1 \\ 0 & \text{others} \end{cases} \quad (10)$$

Accordingly, the following is obtained:

$$x_0 = T_t \begin{pmatrix} x_0[0] \\ \vdots \\ x_0[K-1] \end{pmatrix}. \quad (11)$$

Define the effective precoding matrix $C_0 \in C^{N_t K \times d_0}$ and the overall source symbol vector $s_0 \in C^{K d_0 \times 1}$ at the primary transmitter as $$C_0 = \begin{pmatrix} C_0[0] & 0 & 0 & 0 \\ 0 & C_0[1] & \cdots & 0 \\ \vdots & \vdots & \ddots & \vdots \\ 0 & \cdots & \cdots & C_0[K-1] \end{pmatrix}, \quad (12)$$

and $s_0 = ((s_0[0])^T (s_0[1])^T \ldots (s_0[K-1]^T)^T$. Then, it is possible to obtain the transmit vector from the primary transmitter in (2) as $x_0 = T_t C_0 s_0$. (13). At the primary receiver, the received signal $y_0$ in (2) is first mapped from signal stream on each antenna to symbols on each subcarrier. The mapping matrix is denoted as $T_r \in C^{N_r K \times N_r K}$, where its (i, j) entry is $$r_{i,j} = \begin{cases} 1 & j = \left\lfloor \frac{i-1}{N_r} \right\rfloor + ((i-1)_{\mod N_r})K + 1 \\ 0 & \text{others} \end{cases} \quad (14)$$

Then, the post-processed signal vector $y_0 \in C^{K d_0 \times 1}$, can be expressed as $$\hat{y}_0 = D_0 T_r y_0 = D_0 T_r \left( H_{0,0} x_0 + \sum_{i=1}^{2M} H_{i,0} x_i + FBn_0 \right), \quad (15)$$

where $$D_0 = \begin{pmatrix} D_0[0] & 0 & 0 \\ \vdots & \ddots & \vdots \\ 0 & \cdots & D_0[K-1] \end{pmatrix}. \quad (16)$$

Moreover, if water-filling power allocation is used at the primary transmitter, the power allocation matrix of the source signal from the primary transmitter, $P_0 = E\{s_0(s_0)^H\}$, is a diagonal matrix with diagonal elements $(P_{0,(1)}[0], \ldots, P_{0,(d_0)}[0], \ldots, P_{0,(1)}[K-1], \ldots, P_{0,(d_0)}[K-1])$, where $$P_{0,(h)}[k] = \left( \mu - \frac{\sigma^2}{(\lambda_{0,0,(h)}[k])^2} \right)^+, \quad (17)$$

where $(x)^+ = \max\{0, x\}$ and $\mu$ is chosen to satisfy the total power constraint $\sum_{k=0}^{K-1} \sum_{h=1}^{\min\{N_t, N_r\}} P_{0,(h)}[k] = P_{0,th}$, $P_{0,th}$ is the total power constraint at the primary transmitter.

The transmit signal vector from the i-th SU is $x_i = C_i s_i$, (18), where $S_i \in C^{d_i \times 1}$ is the information vector, $C_i \in C^{M_t(K+L) \times d_i}$ is the precoding matrix and $d_i$ is the number of symbols transmitted by the i-th SU to be determined later. Like the primary receiver, SBSs discard L points and perform DFT. Then, the received signals after DFT at the SBS 1 and SBS 2 are $$y_1 = \sum_{i=1}^{M} H_{i,1} x_i + \sum_{i=M+1}^{2M} H_{i,1} x_i + H_{0,1} x_0 + (FB) \otimes n_1, \quad (19)$$

and

-continued $$y_2 = \sum_{i=M+1}^{2M} H_{i,2}x_i + \sum_{i=1}^{M} H_{i,2}x_i + H_{0,2}x_0 + (FB) \otimes n_2, \quad (20)$$

respectively. $H_{i,j} \in \mathbb{C}^{M_r K \times M_t(K+L)}$, for $i=1, \ldots, 2M$, $j=1, 2$, is the channel matrix from the i-th SU to the j-th SBS, which has the similar form as $H_{i,0}$ in (4). The channel matrix from the primary transmitter, $\tilde{H}_{0,j} \in \mathbb{C}^{M_r K \times N_t K}$, has similar form as $H_{0,0}$ in (3). In (19) and (20), the first term is the summation of the desired signals for the SBS, the second term is the summation of the interference signals from the other cell, the third term is the interference from the PU, and the last term is the noise vector.

At each SBS, a receive beamforming matrix $W_i \in \mathbb{C}^{M_r K \times d_i}$ is conducted to decode the desired signals for the i-th SU. Then, the decoded signal vector for the i-th SU, $r_i \in \mathbb{C}^{d_i \times 1}$, can be expressed as $$r_i = w_i^H \left( \sum_{i=1}^{2M} H_{i,1}x_i + H_{0,1}x_0 + (FB) \otimes n_1 \right), \quad (21)$$

for $i=1, \ldots, M$, and $$r_i = W_i^H \left( \sum_{i=1}^{2M} H_{i,2}x_i + H_{0,2}x_0 + (FB) \otimes n_2 \right), \quad (22)$$

for $i=M+1, \ldots, 2M$.

Each SBS may have accurate CSI about its own cell, interference channels to the other cell, interference channels to the primary receiver and primary power allocation results. The required CSI can be obtained by using feedback channels or learning mechanisms. Note that the PU power allocation results may not be necessary here. Without it, embodiment algorithms still work, but the freedom available to the secondary system may decrease. Based on the CSI, SBSs determine precoding matrices for its served SUs. Once precoding matrices are determined, each SBS sends the effective interference channel information from its served SUs to the other SBS, to the other SBS. At last, SBSs determine receive beamforming and power allocation matrix for its served SUs. Each SU will get information about its own precoding and power allocation matrices from its SBS. Each SBS may requires no CSI for the channels in the other SU cell to reduce the amount of information exchange between two SBSs.

Embodiment precoding matrices of the SUs may be used to generate interference-free transmission to the PU. Based on the operations at the primary link, the interference signal at the primary receiver after the post-processing from the secondary transmitters from (2) and (18) will be $$\hat{I} = D_0 T_r \sum_{i=1}^{2M} H_{i,0} x_i \quad (23)$$

$$= D_0 T_r \sum_{i=1}^{2M} H_{i,0} C_i s_i ..$$

To guarantee interference-free transmission to the primary link for any information vector, $s_i$, the transmitted signal of the i-th SU uses the nullspace of the primary link.

The precoding matrix $C_i$ should satisfy $\tilde{H}_{i,0}C_i = 0$, (24), where $\tilde{H}_{i,0}$ contains the rows of $D_0 T_r H_{i,0}$ with $P_{0,(h)}[k] \neq 0$. The dimension of the nullspace of $\tilde{H}_{i,0}$ is $\dim[\text{null}(\tilde{H}_{i,0})] = M_t(K+L) - \bar{d}_0$, (25), where $$\bar{d}_0 = \sum_{k=0}^{K-1} \sum_{h=1}^{\min\{N_t, N_r\}} 1_{P_{0,(h)}[k]}, \text{ and} \quad (26)$$

$$1_{\{P_{0,(h)}[k] \neq 0\}} = \begin{cases} 1 & P_{0,(h)}[k] \neq 0 \\ 0 & \text{else} \end{cases} \quad (27)$$

Thus, a precoding matrix, $C_i \in \mathbb{C}^{M_t(K+L) \times d_i}$ can be found to fulfill the interference-free constraint in (24) if the number of transmitted symbols from the i-th SU satisfies $d_i \leq M_t(K+L) - \bar{d}_0$. (28)

When the primary link has only one transmit and one receive antenna, and the SU has only one transmit antenna, i.e., $N_t = N_r = M_t = 1$, the number of symbols can be transmitted by each SU is $d_i = L$. Based on (24), the interference at the PU is eliminated after post-processing instead of eliminating interference directly in the received signal. To realize it, secondary link needs the information of the PU power allocation. If the PU power allocation information is not accessible at the secondary link, interference-free transmission can only be achieved by satisfying $H_{i,0}C_i = 0$, (29), where the dimension of the nullspace of $H_{i,0}$ is $M_t(K+L) - M_rK$, which is smaller than the dimension in (25). Correspondingly, the nullspace for secondary link transmission is smaller.

Besides interference to the PU, there exists interference within the secondary system. Next, aspects of this disclosure aim at mitigating interference within the secondary system while satisfying the interference-free constraint to the PU.

Regarding the decoding capability of each SBS. From (4), the receive dimension of the channel matrix to SBSs is $M_rK$. Then, at each SBS, there are $M_rK$-dimensional subspace for signals from all SUs, including the desired and interference signals. Then, the total number of symbols can be decoded at each SBS is $d_r = M_rK$, (30), which is called as the decoding capability of each SBS. To maximize the number of transmit symbols within the secondary system, inter-cell interference signals are aligned into lower dimensions, and thus, more dimensions are allowed for the desired signals. Denote $\bar{d}_j$ as the dimension of the inter-cell interference signals at the j-th SBS. Then, the j-th SBS leaves $(M_rK - \bar{d}_j)$-dimensional space for the signals of SUs.

Due to interference-free constraint to the primary system and dimension constraints at all SUs and SBSs, interference signals can be perfectly- or partially-aligned or cannot be aligned at all.

Regarding the feasibility Condition. For the i-th SU, its precoding matrix, $C_i \in \mathbb{C}^{M_t(K+L) \times d_i}$, are divided into two sub-matrices: $\hat{C}_i \in \mathbb{C}^{M_t(K+L) \times \hat{d}_i}$ for aligned signals and $\check{C} \in \mathbb{C}^{M_t(K+L) \times \check{d}_i}$ for unaligned signals, where $\hat{d}_i + \check{d}_i = d_i$. Then, the precoding matrix can be expressed as $C_i = (\hat{C}_i, \check{C}_i)$. (31). The interference signals at SBS 1 are from SUs in cell 2. To align these interference signals from cell 2, the following is used: $\text{span}(H_{M+1,1}\hat{C}_{M+1}) = \ldots = \text{span}(H_{2M,1}\hat{C}_{2M})$, (32), where $\text{span}(\cdot)$ denotes the space spanned by the column vectors of a matrix. Denote $\bar{H}_1$ as a aligned interference matrix at SBS 1, which implies the space spanned by the column vectors of $\bar{H}_1$ is the aligned interference subspace at SBS 1. Therefore, $\text{span}(\bar{H}_1) = \text{span}(H_{i,1}\hat{C}_i)$, $i=M+1, \ldots, 2M$. (33)

Based on Lemma 1, the aligned interference matrix satisfying (33) can be found through solving $$\begin{pmatrix} -I & H_{(M+1),1} & 0 & \cdots & 0 \\ -I & 0 & H_{(M+2),1} & \cdots & 0 \\ \vdots & \vdots & \ddots & \ddots & \vdots \\ -I & 0 & \cdots & \cdots & H_{(2M),1} \end{pmatrix} \begin{pmatrix} \overline{H}_1 \\ \tilde{C}_{M+1} \\ \vdots \\ \tilde{C}_{2M} \end{pmatrix} = 0, \quad (34)$$

where the space spanned by the column vectors of $\tilde{C}_i$ is the same as the space spanned by the corresponding aligned precoding submatrix, $\hat{C}_i$.

Besides the alignment requirement, the interference-free constraint in (24) should be also satisfied. Then, the aligned interference matrix satisfying both the interference-free constraint in (24) and the alignment requirement in (33) can be found by $$\begin{pmatrix} -I & H_{(M+1),1} & 0 & \cdots & 0 \\ -I & 0 & H_{(M+2),1} & \cdots & 0 \\ \vdots & \vdots & \ddots & \ddots & \vdots \\ -I & 0 & \cdots & \cdots & H_{(2M),1} \\ 0 & \tilde{H}_{(M+1),0} & 0 & \cdots & 0 \\ 0 & 0 & \tilde{H}_{(M+2),0} & \cdots & 0 \\ \vdots & \ddots & \ddots & \ddots & \vdots \\ 0 & \cdots & \cdots & \cdots & \tilde{H}_{(2M),0} \end{pmatrix} \begin{pmatrix} \overline{H}_1 \\ \tilde{C}_{M+1} \\ \tilde{C}_{M+2} \\ \vdots \\ \tilde{C}_{2M} \end{pmatrix} = 0, \quad (35)$$

or $M_1 T_1 = 0$.

Where $$M_1 = \begin{pmatrix} -I & H_{(M+1),1} & 0 & \cdots & 0 \\ -I & 0 & H_{(M+2),1} & \cdots & 0 \\ \vdots & \vdots & \ddots & \ddots & \vdots \\ -I & 0 & \cdots & \cdots & H_{(2M),1} \\ 0 & \tilde{H}_{(M+1),0} & 0 & \cdots & 0 \\ 0 & 0 & \tilde{H}_{(M+2),0} & \cdots & 0 \\ \vdots & \ddots & \ddots & \ddots & \vdots \\ 0 & \cdots & \cdots & \cdots & \tilde{H}_{(2M),0} \end{pmatrix} \quad (36)$$

and $$T_1 = \begin{pmatrix} \overline{H}_1 \\ \tilde{C}_{M+1} \\ \tilde{C}_{M+2} \\ \vdots \\ \tilde{C}_{2M} \end{pmatrix}. \quad (37)$$

Then, the aligned precoding submatrices, $\hat{C}_i$ (i=M+1, ..., 2M), can be determined based on $\tilde{C}_i$. The detail will be provided in the precoding matrix design part. In (36), $M_1$ is a $(MM_rK + M\overline{d}_0) \times (MM_t(K+L) + M_rK)$ matrix. For (35) to have solution, $MM_rK + M\overline{d}_0 < (MM_t(K+L) + M_rK)$ or $m = MM_t(K+L) + M_rK(1-M) - M\overline{d}_0 > 0$, (38) is the feasibility condition for SUs in cell 2. It is also the feasibility condition for SUs in cell 1, where $\overline{H}_2$, (i=1, ..., M) are similarly defined and their constraints can be found similar to (35). When the feasibility condition in (38) is satisfied, perfect- and partially-aligned transmissions will be discussed separately. Otherwise, it is unaligned transmission.

Regarding unaligned transmissions ($m = MM_t(K+L) + M_rK(1-M) - M\overline{d}_0 \leq 0$). If the feasibility condition in (38) is violated, signal alignment cannot be achieved, which corresponds to the unaligned transmission. If the transmitted signals from each SU are all spatially independent, the dimension of the interference signals at SBS 1 will be $\overline{d}_1 = \sum_{i=M+1}^{2M} d_i$. The dimension of the desired and interference signals at SBS 1 is $\sum_{i=1}^{2M} d_i$. Similarly, the dimension of the interference signals at SBS 2 will be $\overline{d}_2 = \sum_{i=1}^{M} d_i$ and the total dimension of the desired and interference signals is $\sum_{i=1}^{2M} d_i$. Then, based on the decoding capacity of each SBS in (30), the total dimension of the desired and interference signals at each SBS should have $$\sum_{i=1}^{2M} d_i \leq M_r K. \quad (39)$$

When the numbers of symbols transmitted by SUs are the same, i.e., $d = d_1$, the following is true $$d \leq \frac{M_r K}{2M}. \quad (40)$$

If the interference-free constraint in (28), i.e., $d_i \leq M_t(K+L) - \overline{d}_0$, is also considered, the maximal number of symbols can be transmitted by each SU for the unaligned transmission will be $$d = \left( \min\left\{ \frac{M_r K}{2M}, M_t(K+L) - \overline{d}_0 \right\} \right)^+. \quad (41)$$

Perfectly-Aligned Transmission ($m = MM_t(K+L) + M_rK(1-M) - M\overline{d}_0 \geq d > 0$) If the number of symbols transmitted by each SU, d, is less than the dimension of the nullspace of $M_1$ in (36), m, i.e., $d \leq m$ it is possible to find a d-dimensional solution for the aligned precoding submatrix, $\hat{C}_i$, satisfying both interference-free constraint in (24) and the alignment requirement in (33) through solving (35) and set the precoding matrix for the i-th SU as $C_i = \hat{C}_i$ (42) to minimize the dimension of the interference subspace at each SBS. In this case, if the transmitted signals from SUs are all spatially independent, there will be d-dimensional interference signals and 2d-dimensional desired signals at each SBS. Based on the decoding capability at each SBS in (30), the total dimension of the desired and interference signals should have $(M+1)d \leq M_r K$. (43)

Thus, maximal number of symbols can be transmitted by each SU is $$d = \frac{M_r K}{M + 1}.$$

(44) Since the condition for this perfectly-aligned transmission is the number of symbols transmitted by each SU, d, is less than the dimension of the nullspace of $M_i$, m, the following is obtained:

$$d = \frac{M_r K}{M + 1} \leq m \quad (45)$$
$$= MM_t(K + L) + M_r K(1 - M) - M\overline{d}_0,$$

which is equivalent to $KMM_r+(1+M)\bar{d}_0 \leq (M+1)(K+L)M_t$, (46)

Partially-Aligned Transmission ($0<m=MM_t(K+L)+M_rK(1-M)-M\bar{d}_0<d$). By the interference-free constraint and the alignment constraint, it is possible that the number of symbols transmitted by each SU, d, is larger than the dimension of the nullspace of $M_i$ in (36), m, i.e., d>m. In this case, the precoding matrix for each SU is constructed by a m-dimensional aligned submatrix $\hat{C}_i$ and a (d−m)-dimensional unaligned submatrix, $\check{C}_i$. In this case, there will be [Md−(M−1)m]-dimensional interference signals at each SBSs, which contains m-dimensional aligned interference signals from the other cell and (d−m)-dimensional unaligned interference signals from each SU in the other cell. Moreover, there are Md-dimensional desired signals from SUs of its own cell. Then, based on the decoding capability of each SBS in (30), the following is obtained: $2Md-(M-1)m \leq M_rK$. (47) Substitute (38) into (47), the maximal number of symbols that can be transmitted will be $$d = \frac{(M-1)(K+L)M_t + K(2-M)M_r - (M-1)\bar{d}_0}{2}. \quad (48)$$

Since the condition that this partially-aligned transmission occurs is the number of symbols transmitted by each SU, d, is larger than the dimension of the nullspace of $M_i$ in (36), m, the following is obtained: $KMM_r+(1+M)\bar{d}_0 > (M+1)(K+L)M_t$, (49) which is the opposite condition of (46). In brief, the maximal number of interference-free symbols can be transmitted by each SU is in (50) at the top of next page, $$d = \begin{cases} \min\left\{\frac{M_rK}{2M}, M_t(K+L) - \bar{d}_0\right\}, & \text{if } MM_t(K+L) + M_rK(1-M) - M\bar{d}_0 < 0 \\ \frac{M_rK}{M+1}, & \text{if } KMM_r + (1+M)\bar{d}_0 \leq (M+1)(K+L)M_t, \\ \frac{(M-1)(K+L)M_t + K(2-M)M_r - (M-1)\bar{d}_0}{2}, & \text{otherwise} \end{cases} \quad (50)$$

where the first, the second, and the third lines correspond to the unaligned, the perfectly- and the partially-aligned transmission, respectively.

Regarding Signal Detection at SBSs: At SBSs, the receive beamforming matrix for SU i, $W_i \in C^{M_rK \times d}$, is used to decode the desired signals from the i-th SU while eliminating interference signals from other SUs, including intra- and inter-cell interference signals. Aspects of this disclosure user may use zero-forcing (ZF) receive beamforming as well as other types of beamforming, such as minimum mean-square error (MMSE) one can be similarly designed. From (21), for the ZF beamforming for SU i in cell 1, the following is obtained:

$$W_i^H \sum_{j=1, j \neq i}^{2M} H_{j,1} C_j x_j = 0. \quad (51)$$

Denote $\hat{I}_i$ and $\check{I}_i$ as the intra- and inter-cell interference matrices, defined as $\hat{I}_i = (H_{1,1}C_1, \ldots, H_{i-1,1}C_{i-1}, H_{i+1,1}C_{i+1}, \ldots, H_{M,1}C_M)$, (52) and $\check{I}_i = (H_{M+1,1}C_{M+1}, \ldots, H_{2M,1}C_{2M})$, (53) respectively. Then, the following is obtained: $W_i \subseteq \text{null}(\hat{I}_i^H, \check{I}_i^H)$. (54) For the perfectly-aligned transmission, the precoding matrix is $C_i = \hat{C}_i$ from (42) and it satisfies the alignment requirement $\text{span}(\overline{H}_1) = \text{span}(H_{j,1}\hat{C}_j)$ (j=M+1, \ldots, 2M) from (33). Then, the following is obtained: $W_i \subseteq \text{null}(\hat{I}_i^H, \check{I}_i^H) = \text{null}((H_{1,1}, \ldots, H_{i-1,1}, H_{i+1,1}, \ldots, H_{M,1}, \overline{H}_1)^H)$. (55) The size of the combined intra- and inter-cell interference matrix $(H_{M+1,1}, \ldots, H_{2M,1}, \overline{H}_1)$ is $M_rK \times Md$. Based on (50), a d-dimensional solution for $W_i$ can be found. For the partially-aligned transmission, the following is obtained $W_i \subseteq \text{null}(\hat{I}_i^H, \check{I}_i^H) = \text{null}((H_{1,1}, \ldots, H_{i-1,1}, H_{i+1,1}, \ldots, H_{M,1}, H_{M+1,1}\check{C}_{M+1}, \ldots, H_{2M,1}\check{C}_{2M}, \overline{H}_1)^H)$, (56) where (33) is used for the second equality. The sizes of the intra-cell interference matrix, the unaligned inter-cell interference matrices, $(H_{M+1,1}\check{C}_{M+1}, \ldots, H_{2M,1}\check{C}_{2M})$ and the aligned inter-cell interference matrix, $\overline{H}_1$, are $M_rK \times (M-1)d$, $M_rK \times M(d-m)$, and $M_rK \times m$, respectively. Based on (50), a d-dimensional solution for $W_i$ can be found. Thus, the receive beamforming matrix, $W_i$ for SU i, can be designed for both perfectly- and partially-aligned transmissions. Similarly, receive beamforming matrices for other SUs can be obtained. Moreover, similar design can be used for the unaligned transmission.

Precoding matrix design for the Perfectly-Aligned Transmission: For the perfectly-aligned transmission, the precoding matrix is constructed by the aligned submatrix only, i.e., $C_i = \hat{C}_i$ from (42). To determine the precoding matrix $C_i$, SVD of $M_i$ from (36) is denoted as $M_i = U_i D_i V_i^H$, where $U_i$ and $V_i$ are unitary matrices, $D_i$ is a diagonal matrix with $M_i$'s singular values as its diagonal elements as $(\lambda_1^{(i)}, \ldots, \lambda_{MM_rK+M\bar{d}_0}^{(i)})$ such that $(|\lambda_1^{(i)}|)^2 \geq \ldots \geq (|\lambda_{MM_rK+M\bar{d}_0}^{(i)}|)^2$. Then, the nullspace of $M_i$ from (36) can be expressed as $N_i = (v_{MM_rK+M\bar{d}_0+1}^{(i)} \ldots v_{MM_t(K+L)+M_rK}^{(i)})$, (57) where $v_k^{(i)}$ is the k-th column of $V_i$.

Aspects of this disclosure provide precoding matrix design for at least the following two cases: (1) the number of symbols transmitted by each SU equals to the dimension of the nullspace of $M_i$ in (36), i.e., d=m; (2) the number of symbols transmitted by each SU is fewer than to the dimension of the nullspace of $M_i$, i.e., d<m. 1)m=d. When the dimension of the nullspace of $M_i$ from (36) equals to the number of symbols that transmitted by each SU, i.e., d=m, all the columns of $N_i$ from (57) will be used to construct precoding matrices. Let the solution for (35) be $$\check{C}_i = \begin{pmatrix} n_{M_rK+(i-M-1)M_t(K+L)+1}^{(1)} \\ \vdots \\ n_{M_rK+(i-M)M_t(K+L)}^{(1)} \end{pmatrix}, \quad (58)$$

where $n_k^{(i)} \in C^{1 \times d}$ is the k-th row of $N_i$. Then, the precoding matrices for SUs i (i=M+1, \ldots, 2M) can be set as $C_i = \text{orth}(\check{C}_i)$, (59) where orth(X) denotes the orthonomal subspace of X. Similarly, the following is obtained $C_i$ (i=1, \ldots, M) based on $N_2$. 1) m>d When the dimension of the nullspace of $M_i$ from (36) is larger than the number of symbols transmitted by each SU, i.e., m>d, it may be appropriate to select a d-dimensional subspace from m-dimensional subspace spanned by the column vectors of $N_i$ from (57) to construct precoding matrices. Since $N_i$ is constructed by uncorrelated unitary vectors $v_k^{(i)}$, the subspace can be selected by choosing d vectors from all column vectors of $N_i$.

Based on the assumption that the information about the inter-cell interference signals is unknown at the precoding matrix design stage, it is possible to select the vectors that can minimize intra-cell interference among SUs in the same cell. Intra-cell and inter-cell interference can be considered jointly to determine precoding matrices, which requires global CSI at SBSs or iterative operations. For the i-th SU, since the ZF beamforming is used at the receiver, maximizing the distance of the signal subspace spanned by the column vector of signal matrices from other SUs in the same cell is beneficial for minimizing the intra-cell interference. Here, chordal distance is used as a metric to measure the distance between two subspaces spanned by the corresponding signal matrices. The chordal distance between matrices A and B is defined as $d_c(A,B)=P\text{orth}(A)\text{orth}(A)^H - \text{orth}(B)\text{orth}(B)^H P_F$. (60)

Based on the chordal distance, it is possible determine a d-dimensional subspace that maximizes the distance of the signal subspaces from different SUs at the intended SBS, where the subspace is spanned by the column vectors of the corresponding signal matrix.

Regarding the Exhaustive Search Algorithm. One way to determine a d-dimensional subspace that maximizes the distance of the signal subspaces from different SUs at the intended SBS is exhaustive search. The detailed procedure is as follows. take the precoding matrix design for SUs in cell 1 as example. Each time, choose d vectors from m column vectors of $N_2$ from (57). There are $$N = \binom{d}{m}$$

combinations. Denote a length d vector $p_k$ as the positions of column vectors from $N_2$ for the k-th combination. Denote $\tilde{N}_{k,2}$ as a matrix constructed by the column vectors of $N_2$ defined by $p_k$. For instance, if d=2, m=3, then $$N = \binom{2}{3} = 3,$$

and $p_1=(1,2)$, $p_2=(1,3)$ and $p_3=(2,3)$, $\tilde{N}_{1,2}$, $\tilde{N}_{2,2}$, and $\tilde{N}_{3,2}$ consist of the first and second columns, the first and third columns, and the second and third columns of $N_2$, respectively.

Then, using $\tilde{N}_{k,2}$ instead of $N_2$ define $C_{i,k}$ following (58) for the case with m=d. Then, the corresponding distance between the signal matrices corresponding to SU i and j in cell 1 is $d_1^g(k,i,j)=d_c(H_{e,i}(k), H_{e,j}(k))$, (61) where $H_{e,i}(k)$ and $H_{e,j}(k)$ are effective channel matrices for SUs i and j, respectively, defined as $H_{e,i}(k)=H_{i,1}C_{i,k}$, (62) for i=1,..., M. Then, the distance between the signal matrices corresponding to SUs in cell 1 is the minimal chordal distance among any two SUs in cell 1, which can be expressed as $$d_1^g(k) = \min_{i,j} d_1^g(k, i, j). \quad (63)$$

To maximize the distance between signal matrices, choose the $k_1^*$-th combination for cell 1 as $$k_1^* = \arg\max_k d_1^g(k). \quad (64)$$

Then, the precoding matrices for SUs in cell 1 are determined as $$C_i = C_{i,k_1^*}. \quad (65)$$

The complexity of the exhaustive search algorithm will increase quickly with the number of antennas at SUs and SBS, the number of subcarriers, K, and the length of CP, L. To decrease the computational complexity, develop a heuristic algorithm.

Instead of considering all possible combinations of columns of $N_i$ from (57) as for the exhaustive search algorithm, the heuristic algorithm considers one column of $N_i$ each time. For each column of $N_i$, one-dimensional precoding vector is determined. Then, the distance between the effective signal vectors at the intended SBS from SUs in the same cell is calculated. At last, choose d vectors that provide the largest d distance values. The detailed procedure is summarized in Table 1 and the main calculation is as follows. From (57), the k-th column vector of $N_2$ is $v_{MM_1K+Md_0+k}^{(2)}$. Using $v_{MM_1K+Md_0+k}^{(2)}$ instead of $N_2$ define $c_{i,k} \in \mathbb{C}^{M_i(K+L)+1}$ following (58) for the case with m=d. Then, the distance of the effective signal vectors at SBS 1 is the minimal distance between any two SUs as $$d_1^h(k) = \min_{i,j}(d_1^h(k, i, j)), k = 1, \ldots, m. \quad (66)$$

where $d_1^h(k,i,j)=d_c(H_{i,1}c_{i,k}, H_{j,1}c_{j,k})$. (67) At last, choose d positions that provide the largest d values of $d_i^h(k)$. The following table is a Heuristic Algorithm for the Perfectly-Aligned Transmission:

TABLE I

HEURISTIC ALGORITHM FOR THE PERFECTLY-ALIGNED TRANSMISSION

| | |
|---|---|
| 1: | Find the null space of $M_1$, denoted as $N_1$ = null ($M_1$). |
| 2: | for k = 1 : m do |
| 3: |   for i = 1 : M − 1 do |
| 4: |     for j = i + 1 : M do |
| 5: |       Calculate $d_1^h(k, i, j) = d_c(H_{i,1}c_{i,k}, H_{j,1}c_{j,k})$, where $c_{i,k}$ and $c_{j,k}$ are defined by the k-th column of $N_1$. |
| 6: |     end for |
| 7: |   end for |
| 8: | Define the distance of the k-th column, $d_1^h(k)$, is the minimal value of $d_1^h(k, i, j)$, express as $d_1^h(k) = \min_{i,j}(d_1^h(k, i, j))$ |
| 9: | end for |
| 10: | Find d largest values of $d_1^h(k)$, record the corresponding column positions in $\mathcal{K}$ |
| 11: | Use the columns of N1 defined in to construct precoding matrices. |

Find the null space of $M_1$, denoted as $N_1=\text{null}(M_1)$. k=1:m i=1:M−1 j=i+1:M Calculate $d_1^h(k,i,j)=d_c(H_{i,1}c_{i,k},H_{j,1}c_{j,k})$, where $c_{i,k}$ and $C_{j,k}$ are defined by the k-th column of $N_1$. Define the distance of the k-th column, $d_1^h(k)$, is the minimal value of $d_1^h(k,i,j)$, expressed as $$d_1^h(k) = \min_{i,j}(d_1^h(k, i, j)).$$

Find d largest values of $d_1^h(k)$, record the corresponding column positions in K. Use the columns of $N_1$ defined in K to construct precoding matrices. For the exhaustive search algorithm, calculate all $$\binom{2}{M}\binom{d}{m}$$

distance values while only $$\binom{2}{M}m$$

distance values are calculated for the heuristic algorithm. The computational complexity decreases dramatically.

Regarding partially-Aligned Transmissions. For the partially-aligned transmission, d>m. Then, the precoding matrix, $C_i$, will be constructed by two submatrices, the aligned submatrix, $\hat{C}_i$, and the unaligned submatrix, $\check{C}_i$, as defined in (31). The design for the aligned submatrix, $\hat{C}_i$, is the same as the case with m=d in the perfectly-aligned transmission. The unaligned submatrix, $\check{C}_i$, should satisfies two constraints: the interference-free constraint in (24), $\tilde{H}_{i,0}\check{C}_i=0$, and orthogonal to the aligned submatrix $\hat{C}_i$. From the orthogonal complement subspace of the subspace spanned by the column vectors of the aligned precoding submatrix, $\hat{C}_i$, in the nullspace of the interference channel from the i-th SU to the primary receiver, $\tilde{H}_{i,0}$, satisfies both constraints. Denote the orthonomal bases of the nullspace of $\tilde{H}_{i,0}$ as $A_i=\text{orth}(\text{null}(\tilde{H}_{i,0}))$. Since the subspace spanned by the column vectors of the aligned precoding submatrix, $\hat{C}_i$, is a subspace of $A_i$, the former one can be expressed as the linear combination of the latter one, expressed as $\hat{C}_i=A_iU_1$, where $U_1$ is the linear transformation matrix from $A_i$ to $\hat{C}_i$. Then, $U_1=A_i^H\hat{C}_i$. The orthogonal complement of the aligned precoding submatrix, $\hat{C}_i$, in $A_i$ can be found as $\hat{C}_i^\perp=A_iU_1^\perp$, (68) where $U_1^\perp$ spans the orthogonal complement subspace of $U_1$, found as $U_1^\perp=\text{null}(U_1^T)$. By the construction, the size of the orthogonal complement subspace of the aligned precoding submatrix, $\hat{C}_1^\perp$, is $M_t(K+L)\times(M_t(K+L)-\bar{d}_0-m)$ and its column vectors are linearly independent. It is obvious that $d-m<M_t(K+L)-\bar{d}_0-m$ from (28), and thus, choose (d−m)-dimensional subspace from the subspace spanned by the column vectors of $\hat{C}_i^\perp$ to construct precoding matrices as similar as the perfectly-aligned transmission. Choose the subspace that maximizes the chordal distance between signals from SUs in the same cell at the intended SBS. Similar to perfectly-aligned case, it is possible to use an exhaustive search and a heuristic algorithm.

Regarding the Exhaustive Search Algorithm: Again, the first method is exhaustive search. For the partially-aligned transmission, the orthogonal complement subspace of the aligned precoding submatrix, $\hat{C}_i^\perp$, are independent for each SU since the nullspace of the interference channel from the i-th SU to the primary receiver, $A_i$, are independent. This is different from the case for determining $\hat{C}_i$, where $\hat{C}_i$ are under alignment constraints. Since $\hat{C}_i^\perp$ for different SUs are independent, the i-th SU can choose (d−m) columns from $\hat{C}_{i\perp}$ independently. For the i-th SU, there are $$N_i = \binom{d-m}{M_t(K+L)-\bar{d}_0-m}$$

combinations. Since there are M SUs, compare $N=N_i^M$ distance values. Similar to the perfectly-aligned transmission, denote $p_{k,i}$ and $p_{k,j}$ to be the position vectors for the i-th and j-th SU in the k-th combination, respectively. Then, the distance for the k-th combination, $d_1^g$, is defined as in (63), where the precoding matrix for SU i for the k-th combination are expressed as $C_i=(\hat{C}_i,\hat{C}_{i,k}^\perp)$, where $\hat{C}_{i,k}^\perp$ is constructed by the column vectors of $\hat{C}_i^\perp$ defined by $p_{k,i}$. At last, the k*-th combination with the largest chordal distance will be chosen and the precoding matrices are defined accordingly.

Regarding the Heuristic Algorithm: The heuristic algorithm for the perfectly-aligned transmission can be also extended here. For this algorithm, each SU will determine its precoding matrix independently by choosing (d−m)-dimensional subspace that has maximal minimum distance to the others. Denote the k-th column of $\hat{C}_i^\perp$ as $\hat{c}_{i,k}^\perp$. For the k-th column, the distance of the i-th SU is defined as the minimal distance from the i-th SU's signal space to other SU's signal spaces in the same cell. At last, choose (d−m) columns that provide (d−m) largest values of distance. The detailed procedure of the heuristic algorithm is shown in Table 2. Table 2: Heuristic Algorithm for the Partially-Aligned Transmission [1] Calculate $\hat{C}_i$ for each SU based on the null space of $M_1$. Determine the orthogonal complement subspaces of $\hat{C}_i$ in the nullspace of $\tilde{H}_{i,0}$, denoted as $\hat{C}_{i\perp}$. i=1:M k=1:$M_t$(K+L)−$\bar{d}_0$−m j≠i t=1:$M_t$(K+L)−K−m Calculate the distance between the signal from the i-th SU and the j-th SU based on the k-th column of $\hat{C}_i^\perp$ and the t-th column of $\hat{C}_j^\perp$, expressed as $d_1^h(i,k,j,t)=d_c(H_{i,1}\hat{c}_{i,k}^\perp, H_{j,1}\hat{c}_{j,t}^\perp)$ (69) Define the distance of the i-th SU to other SUs based on the k-th column of $\hat{C}_i^\perp$ as the minimal distance from the i-th SU to other SUs, expressed as $$d_1^h(i, k) = \min_{j,t} d_1^h(i, k, j, t). \quad (70)$$

Find (d−m) largest values of $d_1^h(i,k)$, record the corresponding column positions in $K_i$. Use the columns of $\hat{C}_i^\perp$ defined in K, and $\hat{C}_i$ to construct precoding matrices. The following table is a Heuristic Algorithm for the Partially-Aligned Transmission:

TABLE II

HEURISTIC ALGORITHM FOR THE PARTIALLY-ALIGNED TRANSMISSION

| | |
|---|---|
| 1: | Calculate $\hat{C}_i$ for each SU based on the null space of $M_1$. |
| 2: | Determine the orthogonal complement subspaces of $\hat{C}_i$ in the nullspace of $\tilde{H}_{i,0}$, denoted as $\hat{C}_i^\perp$. |
| 3: | for i = 1 : M do |
| 4: |   for k = 1 : $M_t$(K + L) − $\bar{d}_0$ − m do |
| 5: |     for j ≠ i do |
| 6: |       for t = 1 : $M_t$(K + L) − K − m do |

TABLE II-continued

HEURISTIC ALGORITHM FOR THE
PARTIALLY-ALIGNED TRANSMISSION

7: Calculate the distance between the signal from the i-th SU and the j-th SU based on the k-th column of $\hat{C}_i^\perp$ and the i-th column of $\hat{C}_j^\perp$, expressed as $$d_1^h(i, k, j, t) = d_c(H_{i,1}\hat{c}_{i,k}^\perp, H_{j,1}\hat{c}_{j,t}^\perp) \quad (69)$$

8: end for
9: end for
10: Define the distance of the i-th SU to other SUs based on the k-th column of $\hat{C}_i^\perp$ as the minimal distance from the i-th SU to other SUs, expressed as $$d_1^h(i, k) = \min_{j,t} d_1^h(i, k, j, t). \quad (70)$$

11: end for
12: Find (d − m) largest values of $d_1^h(i, k)$, record the corresponding column positions in $\mathcal{K}_i$.
13: Use the columns of $\hat{C}_i^\perp$ defined in $\mathcal{K}_i$ and $\hat{C}_i$ to construct precoding matrices.
14: end for Regarding Power Allocation: For the i-th SU, the power allocation matrix is expressed as $P_i = E[s_i s_i^H]$. (71) Based on the ZF receive beamforming in (51), the intra- and inter-cell interference within the secondary system will be eliminated, the decoded signal vector in (21) can be expressed as $r_i = W_i^J(H_{i,1}x_i + H_{0,1}x_0 + (FB) \otimes n_1)$. (72) That means, after receive beamforming, the transmission is equivalent to a point-to-point transmission from the i-th SU to the SBS with interference from the primary transmitter and additive noise. The interference-plus-noise at the i-th SU as $I_i = W_i^J(H_{0,1}x_0 + (FB) \otimes n_1)$. Denote $D_i$ as the post-processing matrix for the i-th SU after receive beamforming. To maximize the transmission rate, a whitening post-processing matrix is used, expressed as $D_i = Q_i^{1/2}$, where $Q_i$ is the covariance matrix of the interference-plus-noise signal, expressed as $Q_i = E[I_i I_i^H]$. Then, the achievable transmission rate for the i-th SU given power allocation matrix $P_i$ will be $$R_i(P_i) = \frac{1}{K+L}\log_2\left|I + Q_i^{-\frac{1}{2}} W_i^H H_{i,1} C_i P_i (D_i W_i^H H_{i,1} C_i)^H Q_i^{-\frac{1}{2}}\right|. \quad (73)$$

Another post-processing matrix based on the SVD of the effective channel matrix $Q_i^{1/2} W_i^H H_{i,1} C_i$ is needed followed by the whitening matrix $D_i$.

Regarding Equal Power Allocation: When equal power allocation scheme is used, the SUs uniformly allocate its total power on each transmit symbols. Then, the power allocation matrix $P_i$ can be expressed as $$P_i = \frac{p_{max}(K+L)}{\text{Trace}(C_i C_i^H)} I = \frac{p_{max}(K+L)}{d} I, \quad (74)$$

where $p_{max}$ is the peak power constraint for each SU.

Regarding Optimal Power Allocation: The optimal power allocation scheme for the i-th SU is designed to maximize its transmission rate given the total power constraint. Then, the problem can be formulated as in (4.3.2) at the top of the next page.

$$\max_{P_i} \quad R_i(P_i) = \frac{1}{K+L}\log_2\left|I + Q_i^{-\frac{1}{2}} W_i^H H_{i,1} C_i P_i (D_i W_i^H H_{i,1} C_i)^H Q_i^{-\frac{1}{2}}\right| \quad (75)$$

s.t. $\text{Trace}\{C_i P_i (C_i)^H\} \leq (K+L)p_{max}$. (76) Followed by the power allocation scheme, the optimal power allocation matrix $P_i$ is $P_i = ((C_i)^H C_i)^{-1/2} V_{\tilde{Q}_i} \tilde{P}_i^* V_{\tilde{Q}_i}^H ((C_i)^H C_i)^{-1/2}$, (77) where $$\tilde{P}_i^*(n,n) = \left(\rho - \frac{1}{\lambda_{n,\tilde{Q}_i}^2}\right)^+, \quad (78)$$

where $\tilde{Q}_i = Q_i^{-1/2} W_i^H H_{i,1} C_i ((C_i)^H C_i)^{-1/2}$ and its SVD of is $\tilde{Q}_i = U_{\tilde{Q}_i} \Lambda_{\tilde{Q}_i} V_{\tilde{Q}_i}^H$ with $U_{\tilde{Q}_i}$ and $V_{\tilde{Q}_i}^H$ being unitary matrices and $\Lambda_{\tilde{Q}_i}$ being a diagonal matrix with the singular values of $\tilde{Q}_i$, $\lambda_{n,\tilde{Q}_i}$, as the diagonal elements, and $\rho$ is determined to satisfy $\Sigma \tilde{P}_i^*(n,n) = (K+L)p_{max}$.

An embodiment considers frequency-selective channels and multiple-input multiple-output (MIMO) systems jointly. An embodiment generates interference-free transmission to the primary user (PU) system, as well as within the secondary user (SU) system.

A previous application by the inventor [1] provides signal alignment scheme for downlink MIMO orthogonal frequency-division multiplexing (OFDM) systems with one cognitive radio (CR) link. Embodiments herein carry this further to signal alignment for opportunistic transmission for a multi-cell uplink multiple-antenna CR network where inter-cell interference is to be mitigated. One scenario is where the primary transmission is based on OFDM, and the nullspace generated by the CP is used for CR transmission using VFDM. Another scenario is when the primary system uses orthogonal frequency-division multiple access (OFDMA). Another scenario is when in addition to the null-space generated by CP, the primary system, after meeting its own quality of service requirements, can release some additional null-space by allocating zero-power on some space and/or frequency dimensions which can be exploited by the secondary system An embodiment provides a signal alignment scheme over both frequency and spatial domains. An embodiment signal alignment scheme simultaneously utilizes the spatial and frequency dimensions left over by a primary link in order to optimize the transmission rate of a multi-cell secondary system without causing interference to the primary link or within the secondary system.

Besides interference to the primary system, intra-cell and inter-cell interference within the secondary network is taken into consideration. An embodiment signal alignment scheme protects the primary transmission while aligning inter-cell interference into a lower-dimensional subspace. An embodiment precoding matrix design for perfectly- and partially-aligned transmissions is provided. Two chordal-distance based schemes, such as a greedy search algorithm and a heuristic algorithm, as well as a random algorithm scheme, are provided for designing the precoding matrices of the secondary system users. An embodiment substantially increases the system spectral efficiency. An embodiment jointly mitigates different types of interference signals, such as interference to the primary system, and intra-cell/inter-cell interference within secondary system. An embodiment allows a secondary multi-antenna and multi-cell uplink system to coexist atop of a primary OFDMA network.

A single-antenna primary system is based on OFDM(A). The number of subcarriers is N. The length of the CP is L. There is a multiple-antenna two-cell secondary system. For the new link, $N_t$ is the transmit antenna, and $N_r$ is the receive antenna. There are M SUs in each cell. Each secondary base station (SBS) has channel state information (CSI) of the interference channels from its own served SUs to the PU receiver. Each SBS also has CSI of its own served SUs. During precoding design, each SBS has CSI of the interference channels from its own served SUs to the other SBS. After precoding matrices are determined, each SBS feeds back the effective interference CSI to the other SBS. Each SBS determines the power allocation matrix, the receive beamforming matrix of its served SUs.

An embodiment provides a design for the secondary system transmission without introducing interference to the PU. An embodiment provides a design for the interference-free transmission within the secondary system. An embodiment increases or attempts to increase the number of interference-free symbols that can be transmitted by the SUs.

An embodiment projects the transmit signals from the SUs to the nullspace of the interference channel from the SU to the PU receiver. An embodiment aligns the interference signals from cell 2 (cell 1) to cell 1 (cell 2) to decrease the dimensions of the interference signals at SBS 1 (S2).

In an embodiment precoding matrix, for the aligned part, there is null interference to the PU, and the interference signals are aligned to the other cell. For the unaligned part, there is null interference to the PU, and it is uncorrelated to the aligned part.

Feasibility condition for signal alignment:

$$m_m = (MN_t(N+L)+N_rN)-(MN_rN+MN) \geq 0$$

Number of symbols that can be transmitted by each SU:

$$d_t = \begin{cases} \frac{N_rN + m_m(M-1)}{2M} & \frac{N_rN}{M+1} \geq m_m \\ \frac{N_rN}{M+1} & \text{other} \end{cases}$$

An embodiment receive beamforming includes zero-forcing to null both inter-cell and intra-cell interference.

An embodiment power allocation matrix has equal power allocation and/or optimal power allocation.

An embodiment precoding matrix design chooses directions. An embodiment chooses subspace for precoding matrix design from all candidates subspaces to maximize the throughput of the SUs. An embodiment maximizes the distance of the signal subspaces from SUs in the same cell to minimize interference. An embodiment uses chordal distance as a distance metric.

Several algorithms may be used for choosing directions, including chordal-distance-based algorithms such as a greedy search algorithm or a heuristic algorithm, and including a random algorithm.

A greedy search algorithm compares all the possible combinations. It generally provides best performance, but has a high computational complexity.

A heuristic algorithm chooses one-dimensional subspace one-by-one. Its performance approaches that of the greedy search algorithm, and it has a lower computational complexity.

A random algorithm chooses directions randomly. It generally has the worst performance of the three, but it has the lowest computational complexity.

Previous systems with multi-antenna simultaneous opportunistic spatial and frequency domain interference alignment only involved a single multi-antenna secondary link. An embodiment designs the precoding matrix of the secondary users to avoid interference to the primary link and within the secondary system. An embodiment provides opportunistic signal alignment over both frequency and spatial domains simultaneously.

Opportunistic transmissions in spatial and frequency domains should play a major role in future 5G networks. An embodiment provides detailed designs for a system and method to enable a secondary multi-antenna and multi-cell system to coexist with a primary system without generating interference to the primary system or within the secondary system.

The attached document entitled "Signal Alignment for Two-Cell CR Networks," which is filed herewith and hereby incorporated herein by reference, provides further description of various embodiments.

Figure 6:
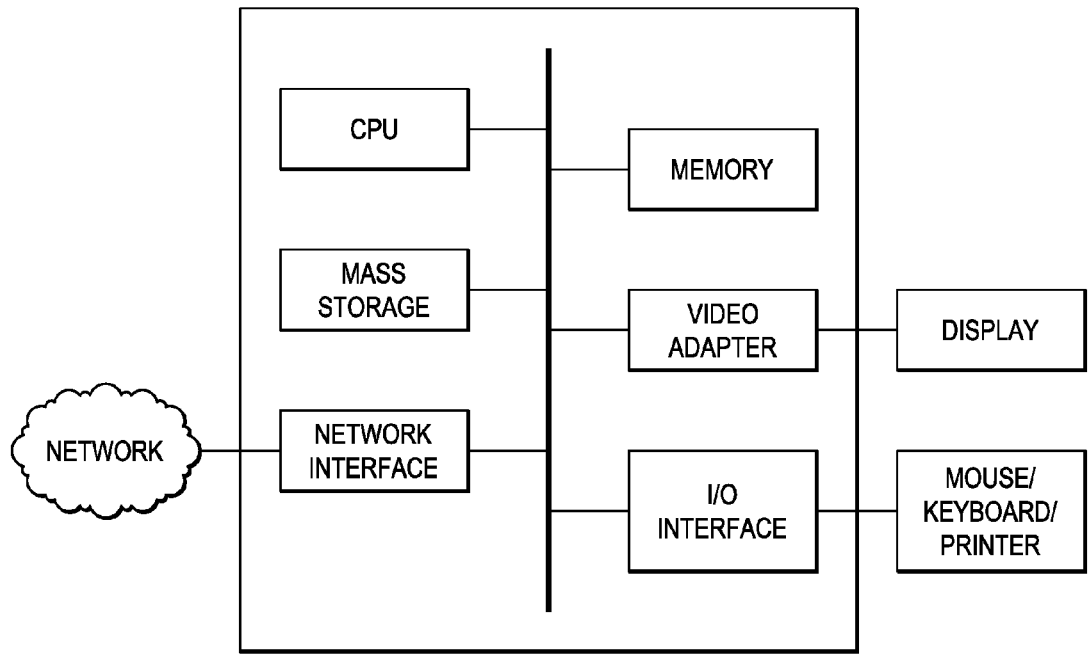
FIG. 6 illustrates a diagram of an embodiment computing platform.

FIG. 6 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 7:
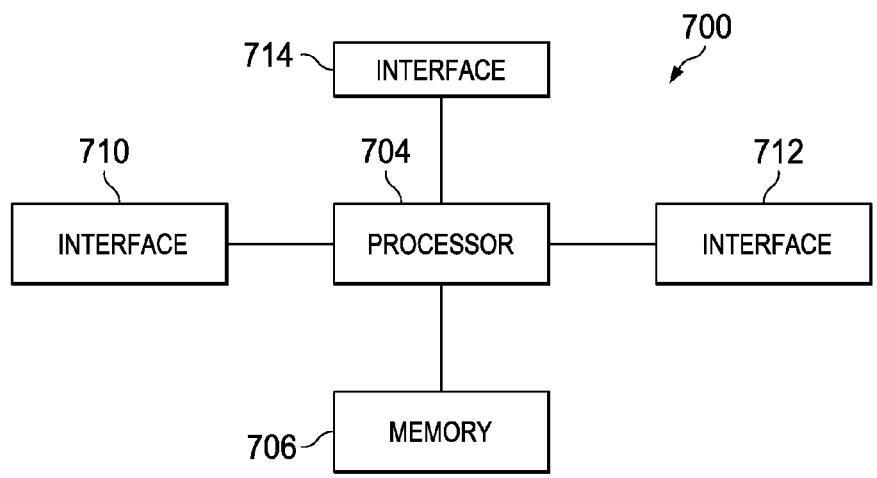
FIG. 7 illustrates a diagram of an embodiment communications device.

FIG. 7 illustrates a block diagram of an embodiment of a communications device 700, which may be equivalent to one or more devices (e.g., UEs, NBs, etc.) discussed above. The communications device 700 may include a processor 704, a memory 706, a cellular interface 710, a supplemental interface 712, and a backhaul interface 714, which may (or may not) be arranged as shown in FIG. 7. The processor 704 may be any component capable of performing computations and/or other processing related tasks, and the memory 706 may be any component capable of storing programming and/or instructions for the processor 704. The cellular interface 710 may be any component or collection of components that allows the communications device 700 to communicate using a cellular signal, and may be used to receive and/or transmit information over a cellular connection of a cellular network. The supplemental interface 712 may be any component or collection of components that allows the communications device 700 to communicate data or control information via a supplemental protocol. For instance, the supplemental interface 712 may be a non-cellular wireless interface for communicating in accordance with a Wireless-Fidelity (Wi-Fi) or Bluetooth protocol. Alternatively, the supplemental interface 712 may be a wireline interface. The backhaul interface 714 may be optionally included in the communications device 700, and may comprise any component or collection of components that allows the communications device 700 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The following references are related to subject matter of the present application. Each of these references is incorporated herein by reference in its entirety: [1] Amine Maaref, U.S. patent application Ser. No. 13/929,493, "System and Method for Interference Avoidance Based on Signal Alignment in Two-Tier MIMO OFDM," filed Jun. 27, 2013.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for signal alignment in a cognitive multi-cell secondary system, the method comprising:
   determining, by a first secondary base station (SBS), a nullspace in a spectrum induced by cyclic prefixes communicated over a primary data channel extending from a primary transmitter to a primary receiver, wherein the first SBS is configured to receive data transmissions from a first one of a plurality of secondary users (SUs), wherein the primary transmitter and the primary receiver are licensed users of the spectrum, and wherein the plurality of SUs are configured to access resources of the spectrum that are not being used by licensed users of the spectrum;
   determining, by the first SBS, a primary interference channel of the first SU and a secondary interference channel of the first SU, the primary interference channel of the first SU extending from the first SU to the primary receiver, and the secondary interference channel of the first SU extending from the first SU to a second SBS, wherein the second SBS is configured to receive data transmissions from a second one of the plurality of SUs, and wherein the second SBS, the first SBS, and the primary receiver are separate and distinct network devices; and
   deriving a precoder for the first SU in accordance with the primary interference channel, the secondary interference channel, and the nullspace induced by the cyclic prefixes communicated over the primary data channel; and
   communicating the precoder to the first SU.

2. The method of claim 1, wherein the precoder is configured to provide both frequency domain precoding and spatial domain precoding on secondary transmission signals communicated from the first SU to the first SBS.

3. The method of claim 2, wherein the spatial domain precoding is configured to mitigate interference from the secondary transmission signal at spatial locations associated with both the primary receiver and the second SBS.

4. The method of claim 3, wherein the frequency domain precoding aligns interference from the secondary transmission signal with the nullspace induced by the cyclic prefixes communicated over the primary data channel.

5. The method of claim 1, wherein the primary transmitter communicates data to the primary receiver using at least one antenna in accordance with an orthogonal frequency division multiplexing (OFDM) scheme.

6. The method of claim 1, wherein the primary transmitter and primary receiver operate in a primary cell, and wherein the first SBS and the second SBS operate in secondary cells positioned within the primary cell.

7. A first secondary base station (SBS) comprising:
   a processor; and
   a non-transitory computer readable storage medium storing programming for execution by the processor, the programming including instructions to:
      determine a nullspace in a spectrum induced by cyclic prefixes communicated over a primary data channel extending from a primary transmitter to a primary receiver, wherein the first SBS is configured to receive data transmissions from a first one of a plurality of secondary users (SUs), wherein the primary transmitter and the primary receiver are licensed users of the spectrum, and wherein the plurality of SUs are configured to access resources of the spectrum that are not being used by licensed users of the spectrum;
      determine a primary interference channel of the first SU and a secondary interference channel of the first SU, the primary interference channel of the first SU extending from the first SU to the primary receiver, and the secondary interference channel of the first SU extending from the first SU to a second SBS, wherein the second SBS is configured to receive data transmissions from a second one of the plurality of SUs, and wherein the second SBS, the first SBS, and the primary receiver are separate and distinct network devices; and derive a precoder for the first SU in accordance the primary interference channel, the secondary interference channel, and the nullspace induced by the cyclic prefixes communicated over the primary data channel; and communicate the precoder to the first SU.

8. The first SBS of claim 7, wherein the precoder is configured to provide both frequency domain precoding and spatial domain precoding on secondary transmission signals communicated from the first SU to the first SBS.

9. The first SBS of claim 8, wherein the frequency domain precoding aligns interference from the secondary transmission signal with the nullspace induced by the cyclic prefixes communicated over the primary data channel.

10. The first SBS of claim 9, wherein the spatial domain precoding is configured to mitigate interference from the secondary transmission signal at spatial locations associated with both the primary receiver and the second SBS.

11. A method for signal alignment in a cognitive multi-cell secondary system, the method comprising:

determining a nullspace in a spectrum induced by cyclic prefixes communicated over a primary data channel extending from a primary transmitter to a primary receiver;

determining at least a first set of primary interference channels and a second set of primary interference channels for a plurality of secondary users (SUs), the plurality of SUs including at least a first set of SUs configured to communicate with a first secondary base station (SBS) and a second set of SUs configured to communicate with a second SBS, wherein the primary transmitter and the primary receiver are licensed users of the spectrum, and wherein the plurality of SUs are configured to access resources of the spectrum that are not being used by licensed users of the spectrum, wherein the first set of primary interference channels extend from SUs in the first set of SUs to the primary receiver, wherein the second set of primary interference channels extend from SUs in the second set of SUs to the primary receiver, and wherein the second SBS, the first SBS, and the primary receiver are separate and distinct network devices;

determining at least a first set of secondary interference channels and a second set of secondary interference channels for the plurality of SUs, wherein the first set of secondary interference channels extend from SUs in the first set of SUs to the second SBS, and wherein the second set of secondary interference channels extend from SUs in the second set of SUs to the first SBS;

deriving precoders for the plurality of SUs in accordance with the first set of primary interference channels, the second set of primary interference channels, the first set of secondary interference channels, the second set of secondary interference channels, and the nullspaces induced by the cyclic prefixes communicated over the primary data channel; and communicating the precoders to the plurality of SUs.

12. The method of claim 11, wherein the precoders include at least a first set of precoders for the first set of SUs and a second set of precoders for the second set of SUs, and wherein the first set of precoders and the second set of precoders are adapted to at least partially align null spaces of interference signals resulting from secondary transmissions of SUs in both the first set of SUs and the second set of SUs with a spatial location of the primary receiver, thereby reducing interference in the primary data channel.

13. The method of claim 12, wherein the first set of precoders at least partially align null spaces of interference signals resulting from secondary transmissions of SUs in the first set of SUs with a spatial location of the second SBS, and wherein the second set of precoders at least partially align null spaces of interference signals resulting from secondary transmissions of SUs in the second set of SUs with a spatial location of the first SBS.

14. The method of claim 11, the precoders are configured to provide both frequency domain precoding and spatial domain precoding on secondary transmission signals communicated from the SUs in the first set of SUs to the first SBS.

15. The method of claim 14, wherein the frequency domain precoding aligns interference from the secondary transmission signals with the nullspaces induced by the cyclic prefixes communicated over the primary data channel.

16. The method of claim 15, wherein the spatial domain precoding is configured to mitigate interference from the secondary transmission signals at spatial locations associated with both the primary receiver and the second SBS.

17. The method of claim 11, wherein the primary transmitter communicates data to the primary receiver using at least one antenna in accordance with an orthogonal frequency division multiplexing (OFDM) scheme.

18. An apparatus comprising:
a processor; and
a non-transitory computer readable storage medium storing programming for execution by the processor, the programming including instructions to:

determine a nullspace in a spectrum induced by cyclic prefixes communicated over a primary data channel extending from a primary transmitter to a primary receiver;

determine at least a first set of primary interference channels and a second set of primary interference channels for a plurality of secondary users (SUs), the plurality of SUs including at least a first set of SUs configured to communicate with a first secondary base station (SBS) and a second set of SUs configured to communicate with a second SBS, wherein the primary transmitter and the primary receiver are licensed users of the spectrum, and wherein the plurality of SUs are configured to access resources of the spectrum that are not being used by licensed users of the spectrum, wherein the first set of primary interference channels extend from SUs in the first set of SUs to the primary receiver, and wherein the second set of primary interference channels extend from SUs in the second set of SUs to the primary receiver, and wherein the second SBS, the first SBS, and the primary receiver are separate and distinct network devices;

determine at least a first set of secondary interference channels and a second set of secondary interference channels for the plurality of SUs, wherein the first set of secondary interference channels extend from SUs in the first set of SUs to the second SBS, and wherein the second set of secondary interference channels extend from SUs in the second set of SUs to the first SBS;

derive precoders for the plurality of SUs in accordance with the first set of primary interference channels, the second set of primary interference channels, the first set of secondary interference channels, the second set of secondary interference channels, and the nullspaces induced by the cyclic prefixes communicated over the primary data channel; and communicate the precoders to the plurality of SUs.

19. The apparatus of claim 18, wherein the precoders include at least a first set of precoders for the first set of SUs and a second set of precoders for the second set of SUs, and wherein the first set of precoders and the second set of precoders are adapted to at least partially align null spaces of interference signals resulting from secondary transmissions of SUs in both the first set of SUs and the second set of SUs with a spatial location of the primary receiver, thereby reducing interference in the primary data channel.

20. The apparatus of claim 18, wherein a first set of precoders at least partially align null spaces of interference signals resulting from secondary transmissions of SUs in the first set of SUs with a spatial location of the second SBS, and wherein a second set of precoders at least partially align null spaces of interference signals resulting from secondary transmissions of SUs in the second set of SUs with a spatial location of the first SBS.

* * * * *